US010997673B2

(12) United States Patent
Yagita et al.

(10) Patent No.: US 10,997,673 B2
(45) Date of Patent: May 4, 2021

(54) CHARGING DEVICE OF CIRCULATING WATER UTILIZATION SYSTEM AND CIRCULATING-WATER UTILIZATION SYSTEM

(71) Applicant: MITSUBISHI HITACHI POWER SYSTEMS, LTD., Yokohama (JP)

(72) Inventors: Hiroyuki Yagita, Tokyo (JP); Junichi Minamiura, Tokyo (JP); Jun Hyodo, Tokyo (JP); Yukinobu Yokota, Tokyo (JP); Hayato Shin, Tokyo (JP); Riki Kitagawa, Tokyo (JP)

(73) Assignee: WOTA GROUP LLC, Kanazawa (JP)

( * ) Notice: Subject to any disclaimer, the term of this patent is extended or adjusted under 35 U.S.C. 154(b) by 494 days.

(21) Appl. No.: 15/100,865

(22) PCT Filed: Dec. 4, 2014

(86) PCT No.: PCT/JP2014/082098
§ 371 (c)(1),
(2) Date: Jun. 1, 2016

(87) PCT Pub. No.: WO2015/083786
PCT Pub. Date: Jun. 11, 2015

(65) Prior Publication Data
US 2016/0292795 A1    Oct. 6, 2016

(30) Foreign Application Priority Data

Dec. 5, 2013    (JP) .............................. JP2013-251620

(51) Int. Cl.
*G06Q 50/06*    (2012.01)
*E03F 7/00*    (2006.01)
(Continued)

(52) U.S. Cl.
CPC ............. *G06Q 50/06* (2013.01); *C02F 1/004* (2013.01); *C02F 1/283* (2013.01); *C02F 1/32* (2013.01);
(Continued)

(58) Field of Classification Search
CPC ........ G06Q 50/06; G06Q 40/12; G06Q 10/06; C02F 1/004; C02F 1/283; C02F 1/32; E03B 1/02; E03F 7/00
See application file for complete search history.

(56) References Cited

U.S. PATENT DOCUMENTS 3,558,255 A * 1/1971 Rose ........................ C02F 3/006
210/101
3,638,490 A * 2/1972 Buettner ................... G01F 1/00
73/302
(Continued)

FOREIGN PATENT DOCUMENTS

JP    S61-230707 A    10/1986
JP    S63-119892 A    5/1988
(Continued)

OTHER PUBLICATIONS

Notice of Allowance of counterpart Japanese Application No. 2013-251620, dated Feb. 25, 2016, with English translation. (6 pages).
(Continued)

*Primary Examiner* — Peter Ludwig
*Assistant Examiner* — Michael Jared Walker
(74) *Attorney, Agent, or Firm* — Westerman, Hattori, Daniels & Adrian, LLP

(57) ABSTRACT

A charging device 10 of a circulating-water utilization system 1 to be constructed in a specific area includes: a wastewater amount measuring unit 18a configured to individually measure an amount of wastewater discharged from
(Continued)

each of water consuming members; a water-quality measuring unit 18b configured to individually measure a water-quality index related to a water quality of the wastewater discharged from each of the water consuming members; and a circulating-water fee calculating part 10A configured to calculate a circulating-water fee of each of the water consuming members on the basis of the amount and the water quality of the wastewater discharged from each of the water consuming members.

6 Claims, 15 Drawing Sheets

(51) Int. Cl.
| | |
|---|---|
| E03B 1/02 | (2006.01) |
| C02F 1/00 | (2006.01) |
| C02F 1/28 | (2006.01) |
| C02F 1/32 | (2006.01) |
| G06Q 10/06 | (2012.01) |
| G06Q 40/00 | (2012.01) |
| C02F 1/38 | (2006.01) |
| C02F 1/42 | (2006.01) |
| C02F 1/44 | (2006.01) |
| C02F 1/68 | (2006.01) |
| C02F 1/76 | (2006.01) |
| C02F 1/78 | (2006.01) |
| C02F 3/30 | (2006.01) |
| C02F 9/00 | (2006.01) |
| C02F 1/40 | (2006.01) |
| C02F 11/12 | (2019.01) |
| G01D 4/02 | (2006.01) |
| C02F 11/127 | (2019.01) |

(52) U.S. Cl.
CPC ............... *C02F 1/38* (2013.01); *C02F 1/40* (2013.01); *C02F 1/42* (2013.01); *C02F 1/441* (2013.01); *C02F 1/444* (2013.01); *C02F 1/68* (2013.01); *C02F 1/76* (2013.01); *C02F 1/78* (2013.01); *C02F 3/30* (2013.01); *C02F 9/00* (2013.01); *C02F 11/12* (2013.01); *E03B 1/02* (2013.01); *E03F 7/00* (2013.01); *G06Q 10/06* (2013.01); *G06Q 40/12* (2013.12); *C02F 1/008* (2013.01); *C02F 11/127* (2013.01); *C02F 2001/007* (2013.01); *C02F 2209/008* (2013.01); *C02F 2209/02* (2013.01); *C02F 2209/05* (2013.01); *C02F 2209/06* (2013.01); *C02F 2209/08* (2013.01); *C02F 2209/10* (2013.01); *C02F 2209/11* (2013.01); *C02F 2209/16* (2013.01); *C02F 2209/18* (2013.01); *C02F 2209/20* (2013.01); *C02F 2209/29* (2013.01); *C02F 2209/36* (2013.01); *C02F 2209/40* (2013.01); *C02F 2303/04* (2013.01); *C02F 2303/24* (2013.01); *G01D 4/02* (2013.01); *Y02A 20/152* (2018.01)

(56) References Cited

U.S. PATENT DOCUMENTS

| | | | | |
|---|---|---|---|---|
| 4,335,606 A * | 6/1982 | Michalak | ............ | G01F 23/0046 33/721 |
| 5,186,052 A * | 2/1993 | Gray | ............ | E03F 7/00 73/215 |
| 5,817,231 A * | 10/1998 | Souza | ............ | B01D 61/08 210/96.2 |
| 5,873,996 A * | 2/1999 | Rozelle | ............ | C02F 1/281 210/104 |
| 5,958,240 A * | 9/1999 | Hoel | ............ | B01D 17/0205 210/167.3 |
| 6,015,496 A * | 1/2000 | Khudenko | ............ | C02F 3/006 210/603 |
| 6,488,853 B1 * | 12/2002 | Mullerheim | ............ | B01D 61/16 210/615 |
| 6,766,822 B2 * | 7/2004 | Walker | ............ | E03B 7/04 137/365 |
| 6,783,679 B1 * | 8/2004 | Rozich | ............ | C02F 3/006 210/614 |
| 8,141,584 B1 * | 3/2012 | Ellyson | ............ | E03B 1/041 137/571 |
| 8,216,455 B1 * | 7/2012 | O'Brien | ............ | C02F 1/30 137/236.1 |
| 8,518,262 B2 * | 8/2013 | Watkins | ............ | B01D 61/025 210/108 |
| 8,747,664 B2 * | 6/2014 | Dier | ............ | C02F 1/003 210/109 |
| 2002/0079267 A1 * | 6/2002 | Savage | ............ | B01D 24/105 210/620 |
| 2002/0179514 A1 * | 12/2002 | Anderson | ............ | C02F 9/00 210/258 |
| 2004/0144704 A1 * | 7/2004 | Johnson | ............ | C02F 9/00 210/170.03 |
| 2006/0163165 A1 * | 7/2006 | Frank | ............ | C02F 1/008 210/739 |
| 2006/0254352 A1 * | 11/2006 | Nivens, Jr. | ............ | G01F 3/28 73/217 |
| 2007/0012628 A1 * | 1/2007 | Frank | ............ | C02F 1/008 210/668 |
| 2007/0119247 A1 * | 5/2007 | Nivens, Jr. | ............ | G01F 3/28 73/217 |
| 2007/0241041 A1 * | 10/2007 | Shimamura | ............ | C02F 11/127 210/197 |
| 2008/0152782 A1 * | 6/2008 | Avgoustopoulos | ............ | B01D 17/0217 426/655 |
| 2009/0020172 A1 * | 1/2009 | Walker | ............ | C02F 1/006 137/563 |
| 2009/0057239 A1 * | 3/2009 | Walker | ............ | C02F 1/006 210/742 |
| 2009/0107915 A1 * | 4/2009 | Skinner | ............ | C02F 9/00 210/636 |
| 2009/0127190 A1 * | 5/2009 | Ong | ............ | C02F 3/1263 210/617 |
| 2010/0163489 A1 * | 7/2010 | Bauder | ............ | C02F 9/00 210/652 |
| 2010/0282654 A1 * | 11/2010 | Hauschild | ............ | C02F 3/1268 210/151 |
| 2010/0307984 A1 * | 12/2010 | Mortensen | ............ | C02F 1/463 210/704 |
| 2011/0068058 A1 * | 3/2011 | Sun | ............ | B01D 61/08 210/620 |
| 2011/0089036 A1 * | 4/2011 | Sparrow | ............ | C02F 1/4693 204/522 |
| 2011/0186510 A1 * | 8/2011 | Whiteman | ............ | C02F 3/00 210/630 |
| 2011/0284433 A1 * | 11/2011 | Shah | ............ | C02F 1/001 210/86 |
| 2011/0303310 A1 * | 12/2011 | Klicpera | ............ | B05B 12/008 137/551 |
| 2011/0303311 A1 * | 12/2011 | Klicpera | ............ | B05B 12/008 137/551 |
| 2012/0285895 A1 * | 11/2012 | Smiddy | ............ | C02F 1/56 210/724 |
| 2013/0001142 A1 * | 1/2013 | Novak | ............ | C02F 3/006 210/96.2 |
| 2013/0008260 A1 * | 1/2013 | Polczynski | ............ | G01F 1/00 73/861 |
| 2013/0105415 A1 * | 5/2013 | Xia | ............ | B01D 29/39 210/791 |
| 2013/0240420 A1 * | 9/2013 | Robertson | ............ | C02F 3/006 210/96.1 |

(56) References Cited

U.S. PATENT DOCUMENTS

| | | | | |
|---|---|---|---|---|
| 2013/0284679 | A1* | 10/2013 | Bailin | C02F 1/004 210/767 |
| 2013/0297529 | A1* | 11/2013 | Shirazi | G06Q 40/06 705/36 R |
| 2016/0319522 | A1 | 11/2016 | Sparre et al. | |

FOREIGN PATENT DOCUMENTS

| | | |
|---|---|---|
| JP | H06-79142 A | 3/1994 |
| JP | H06-210291 A | 8/1994 |
| JP | H06-226059 A | 8/1994 |
| JP | H06-240711 A | 8/1994 |
| JP | H06-269766 A | 9/1994 |
| JP | H06-277455 A | 10/1994 |
| JP | 06-77886 U | 11/1994 |
| JP | H07-68257 A | 3/1995 |
| JP | 7-251186 A | 10/1995 |
| JP | 08-19773 A | 1/1996 |
| JP | H08-229590 A | 9/1996 |
| JP | H09-296493 A | 11/1997 |
| JP | H10-33953 A | 2/1998 |
| JP | H10-57941 A | 3/1998 |
| JP | 10-286033 A | 10/1998 |
| JP | 11-090464 A | 4/1999 |
| JP | H11-114551 A | 4/1999 |
| JP | H11-207155 A | 8/1999 |
| JP | H11-220155 A | 8/1999 |
| JP | 2000-288570 A | 10/2000 |
| JP | 2001-170458 A | 6/2001 |
| JP | 2002-045872 A | 2/2002 |
| JP | 2002-166263 A | 6/2002 |
| JP | 2002-210335 A | 7/2002 |
| JP | 2002-215731 A | 8/2002 |
| JP | 2002-267657 A | 9/2002 |
| JP | 2002-316143 A | 10/2002 |
| JP | 2003-019491 A | 1/2003 |
| JP | 2003-075209 A | 3/2003 |
| JP | 2003-088891 A | 3/2003 |
| JP | 2003-178155 A | 6/2003 |
| JP | 2003-519552 A | 6/2003 |
| JP | 2004-008958 A | 1/2004 |
| JP | 2004-038902 A | 2/2004 |
| JP | 2004-041887 A | 2/2004 |
| JP | 2004-141846 A | 5/2004 |
| JP | 2004-249174 A | 9/2004 |
| JP | 2004-290719 A | 10/2004 |
| JP | 2005-149003 A | 6/2005 |
| JP | 2005-186960 A | 7/2005 |
| JP | 2006-051477 A | 2/2006 |
| JP | 2006-223935 A | 8/2006 |
| JP | 2006-233779 A | 9/2006 |
| JP | 2006-281074 A | 10/2006 |
| JP | 2006-281159 A | 10/2006 |
| JP | 06-302049 A | 11/2006 |
| JP | 2006-302049 A | 11/2006 |
| JP | 2006-305499 A | 11/2006 |
| JP | 2006-310209 A | 11/2006 |
| JP | 2007-185648 A | 7/2007 |
| JP | 2008-307503 A | 12/2008 |
| JP | 2009-073763 A | 4/2009 |
| JP | 2009-124800 A | 6/2009 |
| JP | 2009-153784 A | 7/2009 |
| JP | 2010-120015 A | 6/2010 |
| JP | 2010-188344 A | 9/2010 |
| JP | 2010-253355 A | 11/2010 |
| JP | 2010-538823 A | 12/2010 |
| JP | 4611120 B2 | 1/2011 |
| JP | 2011-078979 A | 4/2011 |
| JP | 2011-152544 A | 8/2011 |
| JP | 2011-189253 A | 9/2011 |
| JP | 2012-092579 A | 5/2012 |
| JP | 2012-106198 A | 6/2012 |
| JP | 5116986 B2 | 1/2013 |
| JP | 2013-034926 A | 2/2013 |
| JP | 2013-043153 A | 3/2013 |
| JP | 2013-188710 A | 9/2013 |
| WO | 2013/176119 A1 | 11/2013 |

OTHER PUBLICATIONS

Notice of Allowance of counterpart Japanese Application No. 2013-251621, dated May 23, 2014, with English translation. (6 pages). (U.S. Appl. No. 15/100,849).

Notice of Allowance of counterpart Japanese Application No. 2013-251622, dated Mar. 24, 2014, with English translation. (6 pages). (U.S. Appl. No. 15/037,601).

Notification of Transmittal of Translation of the International Preliminary Report on Patentability (Form PCT/IB/338) of International Application No. PCT/JP2014/082082 dated Jun. 16, 2016, with Forms PCT/IB/373 and PCT/ISA/237. (11 pages).

International Search Report dated Jan. 13, 2015, issued in counterpart International Application No. PCT/JP2014/082082. (8 pages).

Decision to Grant a Patent dated May 7, 2014, issued in counterpart Japanese Patent Application No. 2013-251625, with English translation, (6 pages).

Office Action dated Feb. 12, 2014, issued in counterpart Japanese Patent Application No. 2013-251630, with English translation. (7 pages).

Decision to Grant a Patent dated May 7, 2014, issued in counterpart Japanese Patent Application No. 2013-251630, with English translation. (6 pages).

International Search Report dated Jan. 13, 2015, issued in counterpart International Application No. PCT/JP2014/082079. (8 pages).

Notification of Transmittal of Translation of the International Preliminary Report on Patentability (Form PCT/IB/338) of International Application No. PCT/JP2014/082079 dated Jun. 16, 2016, with Forms PCT/IB/373 and PCT/ISA/237. (13 pages).

Decision to Grant a Patent dated Mar. 4, 2014, issued in counterpart Japanese Patent Application No. 2013-251627, with English translation. (6 pages).

International Search Report dated Jan. 13, 2015, issued in counterpart International Application No. PCT/JP2014/082080. (7 pages).

Notification of Transmittal of Translation of the International Preliminary Report on Patentability (Form PCT/IB/338) of International Application No. PCT/JP2014/082080 dated Jun. 16, 2016, with Forms PCT/IB/373 and PCT/ISA/237. (11 pages).

Decision to Grant a Patent dated May 23, 2014, issued in counterpart Japanese Patent Application No. 2013-251626, with English translation. (6 pages).

International Search Report dated Jan. 13, 2015, issued in counterpart International Application No. PCT/JP2014/082081. (9 pages).

Notification of Transmittal of Translation of the International Preliminary Report on Patentability (Form PCT/IB/338) of International Application No. PCT/JP2014/082081 dated Jun. 16, 2016, with Forms PCT/Ib/373 and PCT/ISA/237. (15 pages).

International Search Report dated Jan. 13, 2015, issued in counterpart International Application No. PCT/JP2014/062083 (7 pages).

Notification of Transmittal of Translation of the International Preliminary Report on Patentability (Form PCT/IB/338) of International Application No. PCT/JP2014/082083 dated Jun. 16, 2016, with Forms PCT/IB/373 and PCT/ISA/237. (11 pages).

Decision to Grant a Patent dated Feb. 25, 2014, issued in counterpart Japanese Patent Application No. 2013-251624, with English translation. (6 pages).

International Search Report dated Jan. 20, 2015, issued in counterpart International Application No. PCT/JP2014/082093 (7 pages).

Notification of Transmittal of Translation of the International Preliminary Report on Patentability (Form PCT/IB/338) of International Application No. PCT/JP2014/082093 dated Jun. 16, 2016, with Forms PCT/IB/373 and PCT/ISA/237. (11 pages).

Decision to Grant a Patent dated Mar. 4, 2014, issued in counterpart Japanese Patent Application No. 2013-251623, with English translation. (6 pages).

International Search Report dated Feb. 24, 2015, issued in International App. No. PCT/JP2014/082095. (12 pages).

(56) References Cited

OTHER PUBLICATIONS

Notification of Transmittal of Translation of the International Preliminary Report on Patentability (Form PCT/IB/338) of International Application No. PCT/JP2014/082095 dated Jun. 16, 2016, with Forms PCT/IB/373 and PCT/ISA/237. (22 pages).
Decision to Grant a Patent dated Aug. 1, 2014, issued in counterpart Japanese Patent Application No. 2013-251629, with English translation. (6 pages).
International Search Report dated Sep. 10, 2013, issued in International App. No. PCT/JP2013/068920. (7 pages).
Notification of Transmittal of Translation of the International Preliminary Report on Patentability (Form PCT/IB/338) of International Application No. PCT/JP2013/068920 dated Sep. 10, 2013, with Forms PCT/IB/373 and PCT/ISA/237. (10 pages).
Decision to Grant a Patent dated Aug. 12, 2013, issued in counterpart Japanese Patent Application No. 2013-143842, with English translation. (6 pages).
International Search Report dated Sep. 10, 2013, issued in International App. No. PCT/JP2013/068923. (7 pages).
Notification of Transmittal of Translation of the International Preliminary Report on Patentability (Form PCT/IB/338) of International Application No. PCT/JP2013/068923 dated Jan. 12, 2016, with Forms PCT/IB/373 and PCT/ISA/237. (10 pages).
Decision to Grant a Patent dated Aug. 12, 2013, issued in counterpart Japanese Patent Application No. 2013-143843, with English translation. (6 pages).
"Ministry of the Environment", Manual for Industrial Wastewater Treatment Technology Transfer 2002, Mar. 2003, with a concise explanation of the relevance, (133 pages).
Japan Patent Office, Hyojun Gijutsushu (Mizu Shori Gijutsu), May 12, 2006, pp. 94-95.
International Search Report dated Feb. 10, 2015, issued in International App. No. PCT/JP2014/082078. (8 pages).
Notification of Transmittal of Translation of the International Preliminary Report on Patentability (Form PCT/IB/338) of International Application No. PCT/JP2014/082078 dated Jun. 16, 2016, with Forms PCT/IB/373 and PCT/ISA/237. (11 pages).
Decision to Grant a Patent dated Mar. 4, 2014, issued in counterpart Japanese Patent Application No. 2013-251628, with English translation (6 pages).
Notice of Allowance dated Nov. 23, 2016, issued in related U.S. Appl. No. 15/100,849 (10 pages).
International Search Report dated Jan. 20, 2015, issued in counterpart International Application No. PCT/JP2014/082094, with partial translation. (8 pages). (U.S. Appl. No. 15/037,601).
Office Action dated Mar. 4, 2014, issued in counterpart Japanese Patent Application No. 2013-251621, with English translation. (5 pages), (U.S. Appl. No. 15/100,849).
International Search Report dated Jan. 27, 2015, issued in International Patent Application No. PCT/JP2014/082096. (9 pages), (U.S. Appl. No. 15/100,849).
Notification of Transmittal of Translation of the International Preliminary Report on Patentability (Form PCT/IB/338) of International Application No. PCT/JP2014/082096 dated Jun. 16, 2016, with Forms PCT/IB/373 and PCT/ISA/237. (13 pages) (U.S. Appl. No. 15/100,849).
Translation of Notification of Transmittal of Translation of the International Preliminary Report on Patentability (Form PCT/IB/338) of International Application No. PCT/JP2014/082097 dated Jun. 16, 2016, with Forms PCT/IB/373 and PCT/ISA/237. (15 pages), (U.S. Appl. No. 15/100,884).
International Search Report dated Feb. 10, 2015, issued in International Patent Application No. PCT/JP2014/082098. (7 pages).
Notice of Allowance of counterpart Japanese Application No. 2013-251619, dated May 16, 2014, with English translation. (6 pages). (U.S. Appl. No. 15/100,884).
Notice of Allowance of counterpart Japanese Application No. 2013-251620, dated Mar. 4, 2016, with English translation. (6 pages).
Notice of Allowance of counterpart Japanese Application No. 2013-251621, dated Feb. 25, 2014, with English translation. (6 pages). (U.S. Appl. No. 15/100,849).
Translation of Notification of Transmittal of Translation of the International Preliminary Report on Patentability (Form PCT/IB/338) of International Application No. PCT/JP2014/082094, dated Jun. 16, 2016, with Forms PCT/IB/373 and PCT/ISA/237. (11 pages). (U.S. Appl. No. 15/037,601).
Notice of Allowance of counterpart Japanese Application No. 2013-251622, dated May 23, 2014, with English translation. (6 pages). (U.S. Appl. No. 15/037,601).
Translation of Notification of Transmittal of Translation of the International Preliminary Report on Patentability (Form PCT/IB/338) of International Application No. PCT/JP2014/082098 dated Jun. 16, 2016, with Forms PCT/IB/373 and PCT/ISA/237. (11 pages).
International Search Report dated Feb. 10, 2015, issued in International Patent Application No. PCT/JP2014/082097. (8 pages). (U.S. Appl. No. 15/100,884).
Notice of Allowance dated Aug. 4, 2017, issued in U.S. Appl. No. 15/100,884 (36 pages).

* cited by examiner

| WATER-QUALITY INDEX | | SS | NORMAL-HEXANE EXTRACTS | BOD TOC COD | T-P |
|---|---|---|---|---|---|
| 1 | WEIGHTING FACTOR | 0.1 | 0.2 | 0.3 | 0.4 |
| 2 | STANDARD VALUE | 200mg/L | 30mg/L | 40mg/L | 5mg/L |
| 3 | ACTUAL MEASUREMENT | 100mg/L | 15mg/L | 80mg/L | 10mg/L |
| 4 | POLLUTION FACTOR (=ACTUAL MEASUREMENT /STANDARD VALUE) | 0.5 | 0.5 | 2 | 2 |
| 5 | WATER-QLTY UNIT PRICE CORRECTION VALUE (=WEIGHTING FACTOR ×POLLUTION FACTOR) | 0.05 | 0.1 | 0.6 | 0.8 |
| | WATER-QUALITY UNIT-PRICE CORRECTION FACTOR | 1.55 | | | |

…

CHARGING DEVICE OF CIRCULATING WATER UTILIZATION SYSTEM AND CIRCULATING-WATER UTILIZATION SYSTEM

TECHNICAL FIELD

The present disclosure relates to a charging device of a circulating water utilization system to be constructed in a specific area separately from a public waterworks system.

BACKGROUND ART

To make the most of limited water resources, a system for purifying and re-utilizing wastewater discharged from buildings, residences, and the like has been known. For instance, Patent Document 1 discloses a wastewater re-utilization system configured to use drainage of clean water used in a household or the like and rainwater for flushing toilets, for instance, whereby it is possible to save water. Further, Patent Document 2 discloses an interior greening system for utilizing gray water, which produces gray water by processing wastewater from a building and re-utilizes the produced gray water to water plants which are grown inside a building.

CITATION LIST

Patent Literature

Patent Document 1: JPH8-19773A
Patent Document 2: JPH10-286033A
Patent Document 3: JP2002-267657A

SUMMARY

Problems to be Solved

Meanwhile, the applicant is developing a novel circulating-water utilization system having a totally different scale from that of the above described typical re-utilization systems.

The above described typical re-utilization systems are fundamentally intended to purify wastewater of clean water supplied from a waterworks system to utilize the wastewater as gray water for a specific usage in a single building or a single household, for instance, and the used gray water is discharged to a sewage system. In other words, the typical systems require the existing public waterworks system and sewer system as a premise, and cannot replace the existing systems.

In contrast, the novel circulating-water utilization system that the applicant is now working on is, as described in detail below, a system that provides a service of processing clean water and sewage integrally for an area or a complex inhabited by as many as ten thousand people. In the area or the complex, water is supplied and processed in circulation. In other words, this circulating-water utilization system is designed to be supplied with water from a waterworks system only for drinking purpose for a while, and is fundamentally provided as a small distributed system of processing clean water and sewage integrally, constructed independently from existing waterworks systems and sewerage systems.

In development of such a novel circulating-water utilization system, approaches have been sought regarding how to calculate fees of circulating water and drinking water provided by the system.

Patent Document 3 discloses a device which charges fees in accordance with a load amount of wastewater. However, this charging device disclosed in Patent Document 3 requires the existing waterworks system and sewerage system as a premise, and therefore is based on a totally different system from that of the charging device of the present invention, which is designed for a circulating-water utilization system which supplies and processes water in circulation.

At least one embodiment of the present invention was made in view of the above typical problem, and an object of the at least one embodiment is to provide a charging device suitable for a novel circulating-water utilization system to calculate fees for circulating water and drinking water provided by the system, in context of development of such a novel circulating-water utilization system.

Solution to the Problems

A charging device, according to at least one embodiment of the present invention, of a circulating-water utilization system which comprises: a circulation channel through which circulating water flows; a discharge channel through which wastewater discharged from a water consumer is discharged to the circulation channel, the water consumer being composed of a plurality of water consuming members including at least one of a residence, a tenant shop, or an office which uses the circulating water flowing through the circulation channel; a purifying unit configured to purify the circulating water containing the wastewater flowing through the circulation channel; a supply channel configured to supply the circulating water purified by the purifying unit to the water consumer; and a charging device configured to calculate a circulating-water fee for each of the water consuming members, comprises: a wastewater amount measuring unit configured to individually measure an amount of wastewater discharged from each of the water consuming members; a water-quality measuring unit configured to individually measure a water-quality index related to a water quality of the wastewater discharged from each of the water consuming members; and a circulating-water fee calculating part configured to calculate a circulating-water fee of each of the water consuming members on the basis of the amount and the water quality of the wastewater discharged from each of the water consuming members.

Typically, in a charging system of a public waterworks and sewerage system, an amount of used clean water is directly measured, and an amount of used sewerage is estimated on the basis of the amount of used clean water, and thereby fees for clean water and sewerage are individually calculated on the basis of the amount of usage to charge a water consumer. The sewerage fee is calculated regardless of the water quality of wastewater.

In contrast, the charging device of the circulating-water utilization system described above is different from that of a typical public waterworks and sewerage system in that a circulating-water fee is calculated for each of water consuming members on the basis of the amount and the water quality of wastewater discharged from each of the water consuming members.

With the charging device of the circulating-water utilization system according to an embodiment of the present invention, fees are charged on the basis of wastewater, and thereby it is possible to take into account wastewater not coming from the system that cannot be determined if only a supply amount is measured, and thus to set up a fairer charging system.

Further, in the present circulating-water utilization system, wastewater needs to be purified to such a level that the wastewater can be utilized as daily life water, which requires a significant amount of purification cost especially if the water quality of the wastewater is low. Thus, charging a fee only on the basis of an amount of wastewater may generate a gap between cost required to purify wastewater and a fee charged on each water consuming member, which may provoke a feeling of unfairness. In this regard, the charging device of the above circulating-water utilization system calculates a circulating-water fee on the basis of the water quality of wastewater, which makes it possible to set up an even fairer charging system.

In some embodiments, the circulating-water fee calculating part is configured to calculate the circulating-water fee by multiplying the amount of the wastewater discharged from each of the water consuming members measured by the wastewater amount measuring unit by a wastewater-processing unit price which is set on the basis of the water-quality index related to the water quality of the wastewater discharged from each of the water consuming members measured by the water-quality measuring unit.

According to this embodiment, a circulating-water fee is calculated on the basis of a wastewater-processing unit price set on the basis of the water quality of wastewater discharged from each of the water consuming members, and thereby it is possible to set up an even fairer charging system.

In some embodiments, the wastewater-processing unit price is set on the basis of a plurality of the water-quality indexes.

According to this embodiment, it is possible to set a wastewater-processing unit price that precisely reflects the water quality of wastewater, which makes it possible to set up an even fairer charging system.

In some embodiments, the wastewater-processing unit price is set taking account of a weighting factor which is determined in advance for each of the plurality of water-quality indexes.

According to this embodiment, for a plurality of water indexes, it is possible to set a higher weighting factor for a water-quality index that accounts for a larger proportion of a purifying cost and a lower weighting factor for a water-quality index that accounts for a smaller proportion of the purifying cost, for instance, and thus to set up an even fairer charging system that reflects the water quality of wastewater precisely.

In some embodiments, the wastewater-processing unit price is set in accordance with a water-quality unit-price correction factor which is calculated by multiplying a pollution factor by the weighting factor, the pollution factor being a ratio of an actual measurement of the water quality index to a predetermined standard value.

According to this embodiment, a pollution factor which is a ratio of an actual measurement of a water-quality index to a predetermined standard value is used, and thereby it is possible to set a wastewater-processing unit price that reflects a plurality of water-quality indexes precisely, and thus to set up an even fairer charging system.

In some embodiments, the circulating-water utilization system further comprises a drinking-water producing unit configured to produce drinking water for the water consumer by purifying water taken from outside. The charging device further comprises: a drinking-water amount measuring unit configured to individually measure an amount of drinking water to be supplied to each of the water consuming members; a drinking-water-quality measuring unit configured to individually measure a drinking-water quality index related to a drinking-water quality of the drinking water to be supplied to each of the water consuming members; and a drinking-water fee calculating part configured to calculate a drinking-water fee for each of the water consuming members on the basis of the amount and the drinking-water quality of the drinking water to be supplied to each of the water consuming members.

According to this embodiment, it is possible to calculate a drinking-water fee of drinking water to be supplied to each of the water consuming members on the basis of not only an amount of drinking water to be supplied but also a drinking-water quality of the drinking water.

Advantageous Effects

According to at least one embodiment of the present invention, it is possible to provide a charging device suitable for a novel circulating-water utilization system to calculate fees for circulating water, in context of development of the novel circulating-water utilization system

DETAILED DESCRIPTION

Embodiments of the present invention will now be described in more detail with reference to the accompanying drawings.

However, the scope of the present invention is not limited to the following embodiments. It is intended that dimensions, materials, shapes, relative positions and the like of components described in the embodiments shall be interpreted as illustrative only and not limitative of the scope of the present invention.

Figure 1:
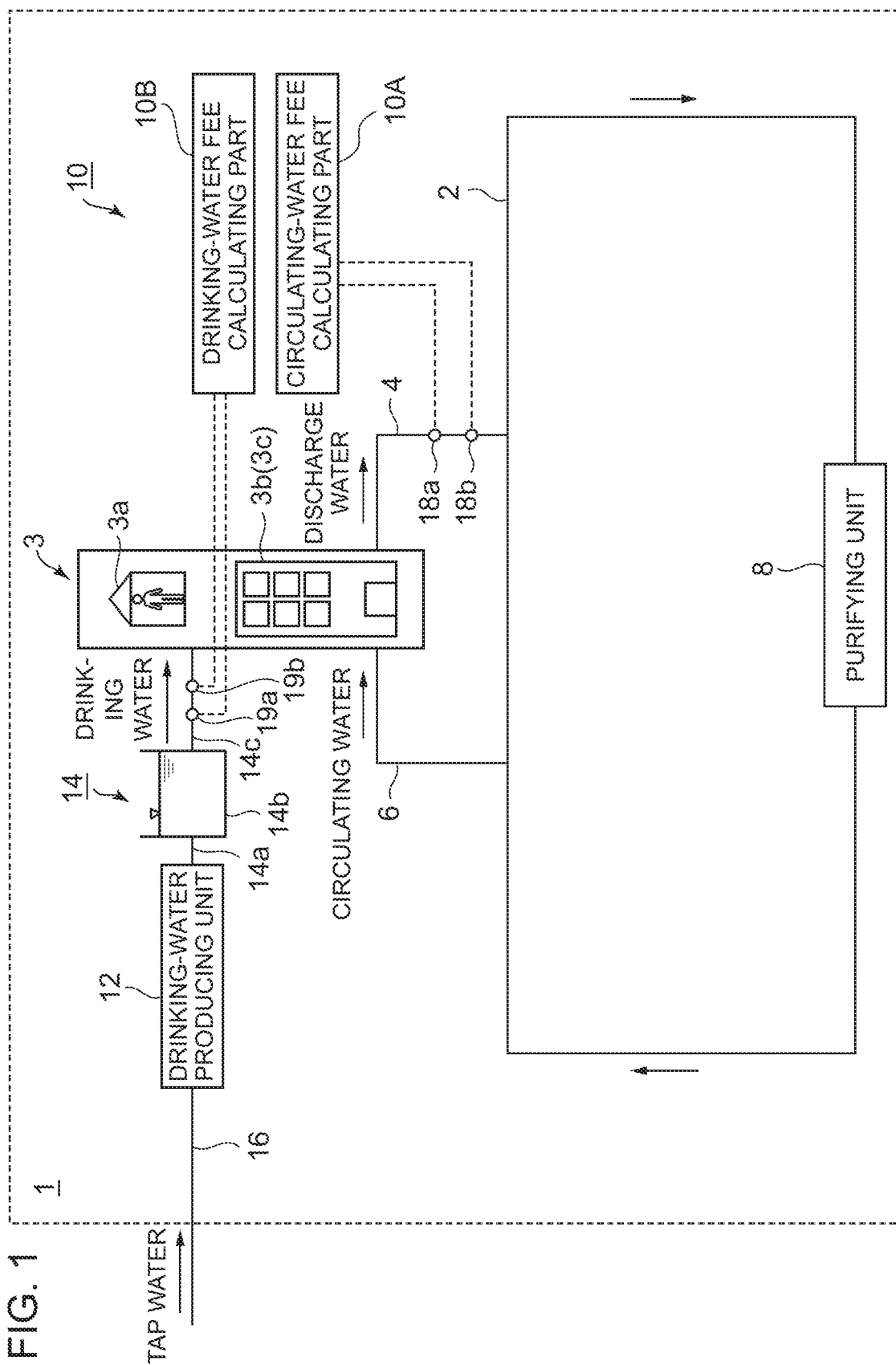
FIG. 1 is an overall schematic diagram of a circulating-water utilization system according to at least one embodiment of the present invention.

FIG. 1 is an overall schematic diagram of a circulating-water utilization system according to at least one embodiment of the present invention.

A circulating-water utilization system 1 is constructed in a specific area separately from a public waterworks system. The present system is designed to be applied to a population of approximately 5,000 to 20,000. An area of application is supposed to be an apartment composed of residences, an office building composed of offices, a commercial facility composed of tenant shops, a complex composed of combination of the above, or the like.

As illustrated in FIG. 1, the circulating-water utilization system 1 includes a circulation channel 2, a water consumer 3, a discharge channel 4, a supply channel 6, a purifying unit 8, a charging unit 10 (charging device), a drinking-water producing unit 12, and a drinking-water supply unit 14, for instance.

The circulation channel 2 is configured as a piping network of water pipeline arranged in a closed loop. Various devices such as a pump (not depicted) and a valve (not depicted) are disposed where needed in the circulation channel 2 in accordance with terrain conditions or the like, so that circulating water flows circulating in a direction.

Raw water of circulating water that flows through the circulation channel 2 is not limited to tap water supplied from a public waterworks system, and may be well water, river water, rain water, or desalinated sea water, for instance. Further, if circulating water is insufficient, such raw water may be taken into the circulation channel 2 from outside as makeup water. If raw water is taken into the circulation channel 2 as makeup water, the raw water may be taken into treatment vessels of the purifying unit 8 described below in accordance with the water quality level of the raw water. For instance, well water, river water, and desalinated sea water, which have a relatively high water quality, may be taken into a coarse-membrane container L4 or a fine-membrane container L5 of the purifying unit 8 described below, and rain water with a relatively low water quality may be taken into a permeable container L2 or an aerobic container L3.

The water consumer 3 is a subjective member that utilizes circulating water that flows through the circulation channel 2 as daily life water. The water consumer 3 is composed of a plurality of water consuming members including at least one of a residence 3a, a tenant shop 3b, or an office 3c. A residence 3a refers to a unit of an apartment complex or a stand-alone house inhabited by a family. A tenant shop 3b refers to a shop or the like which offers services to the general consumer in a section of a commercial facility. The business category of the tenant shops may include, for instance, the retailing business such as clothing stores, grocery stores, drug stores, and alcohol stores, as well as the food-service business such as restaurants, cafes, sushi bars, and pubs. An office 3c refers to a place where employees working at the place do desk work for a certain purpose in a section of an office building, for instance.

In the residence 3a, daily life water is used for shower, bath, washing clothes, washing dishes, washing face and hands, toilet, etc. In the tenant shop 3b, daily life water is used for cleaning, toilet, etc. The amount of water demand is widely varied between different kinds of businesses. For instance, a restaurant uses far more daily life water than a retail store. The office 3c mainly uses daily life water for toilet.

Further, the water consumer 3 is supplied with drinking water separately from the above described circulating water. This drinking water is produced by further purifying tap water introduced from a public waterworks system, and has a quality equivalent to that of mineral waters sold at market. This system can alleviate anxiety of users who may hesitate to drink circulating water, and is expected to provide a selling point for popularizing the present circulating-water utilization system 1.

Tap water is introduced into the drinking-water producing unit 12 from a public water works system via a tap-water introducing channel 16. The drinking-water producing unit 12 produces drinking water for the water consumer 3 by purifying the introduced tap water. The drinking-water producing unit 12 comprises a container-type treatment vessel including a container that houses a processing device that performs a treatment step consisting a series of purifying steps, similarly to the purifying unit 8 described below. The drinking-water producing unit 12 may comprise a plurality of the container-type treatment vessels connected in series along an order of treatment steps.

In the present specification, a container refers to a box-shaped reservoir whose dimensions are standardized for transportation purpose.

Drinking water produced by the drinking-water producing unit 12 is supplied to each water consuming member by the drinking-water supply unit 14. The drinking-water supply unit 14 comprises a drinking-water feeding channel 14a, a reservoir tank 14b, and a drinking-water channel 14c. Drinking water produced by the drinking-water producing unit 12 is fed to the reservoir tank 14b via the drinking-water feeding channel 14a and stored temporarily in the reservoir tank 14b. The drinking water stored in the reservoir tank 14b is supplied to each of the water consuming members including the above described residence 3a, tenant shop 3b, and office 3c via the drinking-water channel 14c.

The discharge channel 4 is a channel for draining wastewater discharged from the water consumer 3 to the circulation channel 2. Wastewater discharged from the discharge channel 4 includes drinking water and water not from the system, in addition to circulating water having been utilized by the water consumer 3 as daily life water. The supply channel 6 is a channel for supplying circulating water purified by the following purifying unit 8 to the water consumer 3 as daily life water. The discharge channel 4 and the supply channel 6 both comprise pipeline. Various devices such as a pump (not depicted) and a valve (not depicted) are disposed where needed in the discharge channel 4 and the supply channel 6 in accordance with terrain conditions or the like, so that wastewater drains to the circulation channel 2, or circulating water is supplied to the water consumer 3.

The purifying unit 8 is a unit to purify circulating water containing waste water that flows through the circulation channel 2. The purifying unit 8 comprises a container-type treatment vessel including a container that houses a processing device that performs a treatment step consisting a series of purifying steps. The drinking-water producing unit 12 may comprise a plurality of the container-type treatment vessels connected in series along an order of treatment steps.

Further, in the present circulating-water utilization system 1, the circulation channel 2 is not connected to a public sewage system. As described below, excess sludge such as sludge cake produced during purification of wastewater is carried out of the system, but otherwise wastewater is re-utilized 100%. In other words, the present circulating-water utilization system 1 is a full-circulation type circulating-water utilization system that supplies and processes water in circulation within the system, and does not discharge sewage water out of the system.

A charging unit 10 (charging device) calculates a fee for using circulating water fee (circulating-water fee) for each of the above described water consuming members.

As depicted in FIG. 1, the charging unit 10 at least comprises a wastewater amount measuring unit 18a, a water-quality measuring unit 18b, and a circulating-water fee calculating part 10A.

The wastewater amount measuring unit 18a comprises, for instance, a flow meter disposed in the discharge channel 4 to measure a volume or a weight of wastewater discharged from the water consumer 3. The water-quality measuring unit 18b comprises, for instance, various water-quality sensors disposed in the discharge channel 4 to measure various water quality indexes of wastewater discharged from the water consumer 3, including suspended solids (SS), biological oxygen demand (BOD), total organic carbon (TOC), chemical oxygen demand (COD), total nitrogen (T-N), total phosphorus (T-P), normal-hexane extracts, bacteria such as *Escherichia coli*, or the like. Further, the water-quality measuring unit 18b may comprise a portable water-quality test kit, a microfluidic device, or the like, instead of the above fixed water-quality sensors. Still further, the water-quality measuring unit 18b may be configured to measure a water-quality index successively or periodically.

Figures 4, 5:
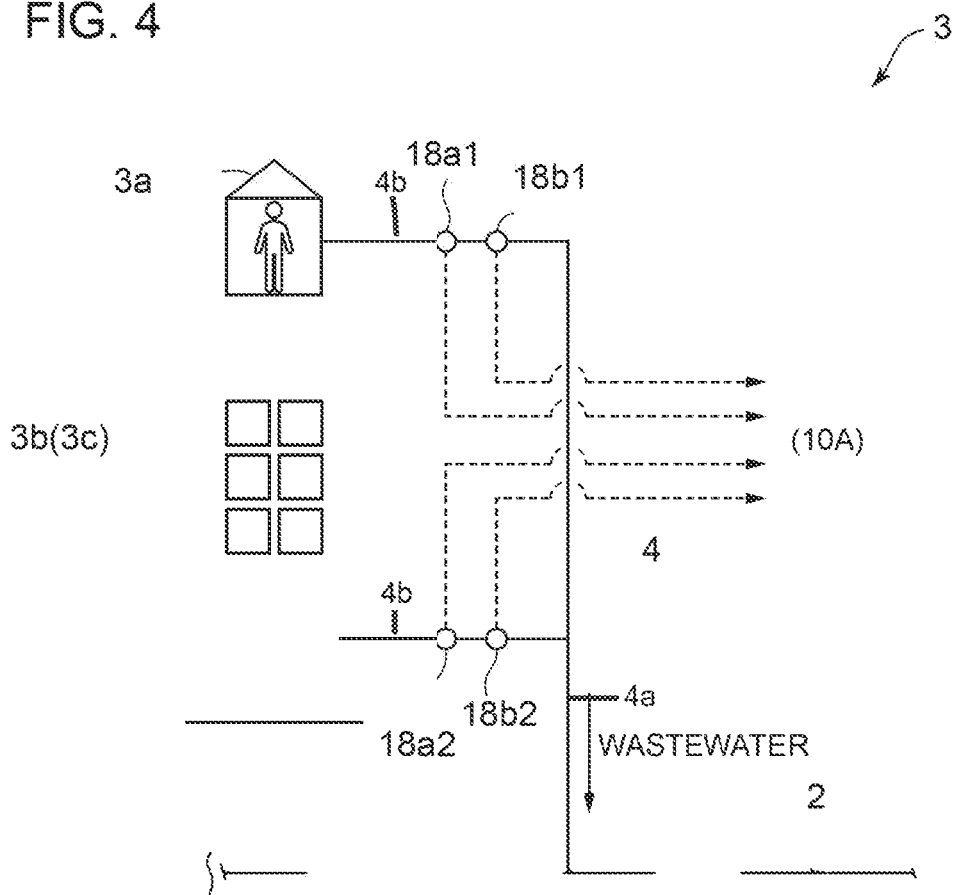
FIG. 4 is a partial schematic diagram of a circulating-water utilization system for describing a wastewater amount measuring unit and a water-quality measuring unit according to the present embodiment.
FIG. 5 is a chart showing a calculation example of a water-quality unit-price correction factor.

As illustrated in FIG. 4, the wastewater amount measuring unit 18a comprises a plurality of flow meters 18a1, 18a2, so as to measure a volume of wastewater discharged from respective water consuming members including the residence 3a, the tenant shop 3b, and the office 3c. Further, as illustrated in FIG. 4, the discharge channel 4 include a main-discharge channel 4a and a plurality of sub-discharge channels 4b, and the water-quality measuring unit 18b also comprises a plurality of water-quality sensors 18b1, 18b2, so as to measure water quality of wastewater discharged from respective water consuming members including the residence 3a, the tenant shop 3b, and the office 3c.

The circulating-water fee calculating part 10A, and a drinking-water fee calculating part 10B described below are each configured as a microcomputer including a central processing unit (CPU), a random access memory (RAM), a read only memory (ROM), and an I/O interface. The circulating-water fee calculating part 10A calculates a circulating-water fee for each of the water consuming members in accordance with a calculation logic shown in FIG. 2 and a calculation flow shown in FIG. 3.

Figure 2:
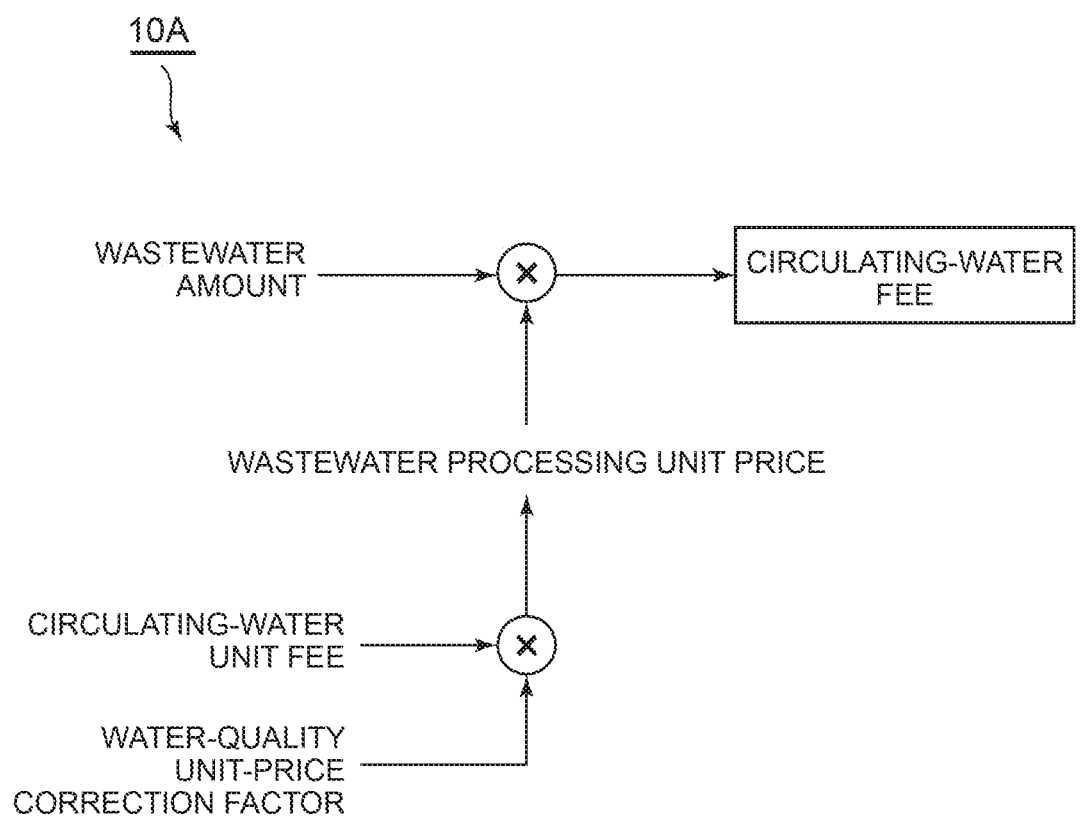
FIG. 2 is a diagram showing a calculation logic of a circulating-water fee for a circulating-water fee calculating part.

FIG. 2 is a diagram showing a calculation logic of a circulating-water fee for a circulating-water fee calculating part. As shown in FIG. 2, the circulating-water fee calculating part 10A calculates a circulating-water fee by multiplying a volume of wastewater discharged from each of the water consuming members measured by the wastewater amount measuring unit 18a by a wastewater-processing unit price. A waste-water processing unit price is calculated by multiplying a circulating-water unit fee by a water-quality unit-price correction factor set on the basis of a water-quality index related to water quality of wastewater measured by the water-quality measuring unit 18b.

Figure 3:
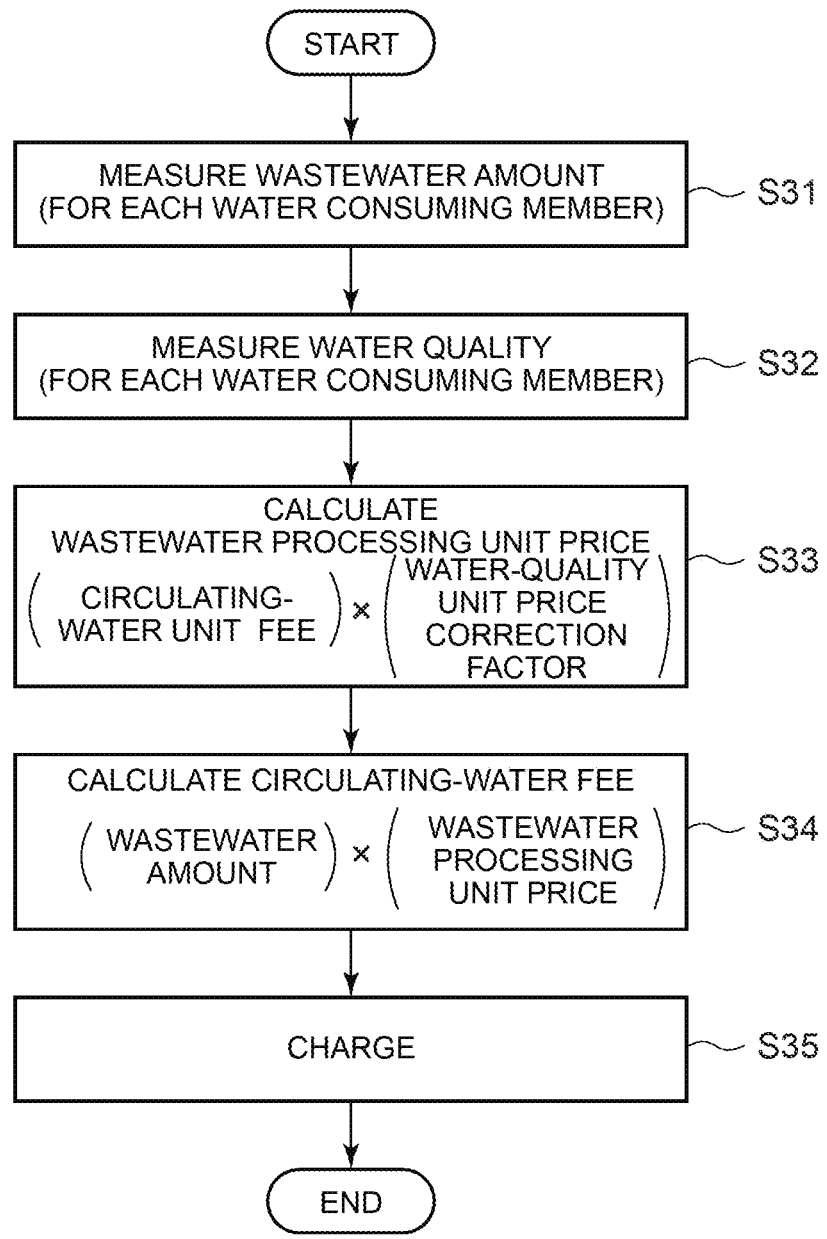
FIG. 3 is a diagram showing a calculation flow of a circulating-water fee of a charging device.

FIG. 3 is a diagram showing a calculation flow of a circulating-water fee of a charging device. As shown in FIG. 3, the above described wastewater amount measuring unit 18a measures a volume of wastewater discharged from each of the water consuming members (S31). Next, the above described water-quality measuring unit 18b measures a water-quality index related to water quality of wastewater discharged from each of the water consuming members (S32). The order of steps S31 and S32 may be reversed, or the steps may be performed simultaneously. In step S33, a wastewater-processing unit price is calculated.

A wastewater-processing unit price is calculated by multiplying a circulating-water unit fee by a water-quality unit-price correction factor. A circulating-water unit fee is set for each circulating-water utilization system, each business category, each contract scale, and the like as a flat fee, for instance. A water-quality unit-price correction factor is a correction factor set in accordance with a water quality of wastewater, and is set as shown in FIG. 5, for instance.

FIG. 5 is a chart showing a calculation example of a water-quality unit-price correction factor. In the embodiment shown in the drawing, for example, a water-quality unit-price correction factor is calculated from four water-quality indexes: suspended solids (SS); normal hexane extracts (oil); BOD, TOC, COD, or the like (organic substances); and total phosphorus (T-P).

As shown in FIG. 5, a weighting factor is set in advance for each of the plurality of water-quality indexes. These weighting factors may be set in accordance with proportions to a purifying cost, for instance. The weighting factors of the water-quality indexes are distributed so as to add up to one in total.

A standard value is set for each of the plurality of water-quality indexes. A standard value is a value serving as a standard in calculation of a circulating-water fee, and set as a standard capacity of the purifying unit 8, for instance. Further, for instance, the standard values may be variable in accordance with a contract type or the like.

A pollution factor is an index for evaluating a level of pollution for each water-quality index, and is defined as a ratio of an actual measurement of the water-quality index to the standard value. An actual measurement of a water-quality index used here is a measurement of a water-quality index measured by the water-quality measuring unit 18b. As an actual measurement, a mean value in a predetermined period is used, for instance. A water-quality unit-price correction value is calculated for each water-quality index by multiplying a pollution factor by a weighting factor described above. Further, these water-quality unit-price correction values of the water-quality indexes are added up to obtain water-quality unit-price correction factors. In the illustrated embodiment, amounts of pollution components that need to be processed are larger than a standard value with regard to water-quality indexes having a higher weighting factor. Thus, a wastewater-processing unit price is 1.55 times the circulating-water unit fee.

Referring again to the flowchart of FIG. 3, a wastewater-processing unit price is calculated in step S33, and then a wastewater amount is multiplied by the calculated wastewater-processing unit price to obtain a circulating-water fee (S34). Then, finally, the calculated circulating-water fee is charged on each of the water consuming members (S35).

As described above, with the charging device 10 of the circulating-water utilization system 1 according to an embodiment of the present invention, fees are charged on the basis of wastewater, which makes it possible to take into account wastewater not coming from the system that cannot be determined if only a supply amount is measured, and thus to set up a fairer charging system.

Further, in the present circulating-water utilization system 1, wastewater needs to be purified to such a level that the wastewater can be utilized as daily life water, which requires a significant amount of purification cost especially if the water quality of the wastewater is low. Thus, charging a fee only on the basis of an amount of wastewater may generate a gap between cost required to purify wastewater and a fee charged on each water consuming member, which may provoke a feeling of unfairness. In this regard, the charging device 10 of the above circulating-water utilization system 1 calculates a circulating-water fee on the basis of the water quality of wastewater, which makes it possible to set up an even fairer charging system.

Further, as described above, a circulating-water fee is calculated on the basis of a wastewater-processing unit price set on the basis of the water quality of wastewater discharged from each of the water consuming members, and thereby it is possible to set up an even fairer charging system.

Still further, as described above, a wastewater-processing unit price is set on the basis of a plurality of water-quality indexes, which makes it possible to set a wastewater-processing unit price that precisely reflects the water quality of wastewater, which makes it possible to set up an even fairer charging system.

Further, as described above, a weighting factor is set in advance for each of the plurality of water-quality indexes, and thereby it is possible to, for a plurality of water indexes, set a higher weighting factor for a water-quality index that accounts for a larger proportion of a purifying cost and a lower weighting factor for a water-quality index that accounts for a smaller proportion of the purifying cost, for instance, and thus to set up an even fairer charging system that reflects the water quality of wastewater precisely.

Still further, as described above, pollution factors each of which is a ratio of an actual measurement of a water-quality index to a predetermined standard value are used, which makes it possible to set a wastewater-processing unit price that reflects a plurality of water-quality indexes precisely, and thus to set up an even fairer charging system.

In some embodiments, the circulating-water utilization system 1 comprises a drinking-water producing unit 12 which purifies tap water taken in from a waterworks system to produce drinking water for the water consumer 3, as described above.

Drinking water produced by the drinking-water producing unit 12 is supplied to each water consuming member by the drinking-water supply unit 14. The drinking-water supply unit 14 comprises a drinking-water feeding channel 14a, a reservoir tank 14b, and a drinking-water channel 14c. Drinking water produced by the drinking-water producing unit 12 is fed to the reservoir tank 14b via the drinking-water feeding channel 14a and stored temporarily in the reservoir tank 14b. The drinking water stored in the reservoir tank 14b is supplied to each of the water consuming members including the above described residence 3a, tenant shop 3b, and office 3c.

Further, the above described charging device 10 further comprises a drinking-water amount measuring unit 19a which individually measures a drinking-water amount supplied to each of the water consuming members, a drinking-water-quality measuring unit 19b which individually measures a drinking-water-quality index related to a drinking water quality of drinking water supplied to each of the water consuming members, and a drinking-water fee calculating part 10B which calculates a drinking-water fee for each of the water consuming members on the basis of the amount and the drinking water quality of drinking water supplied to each of the water consuming members.

Figure 8:
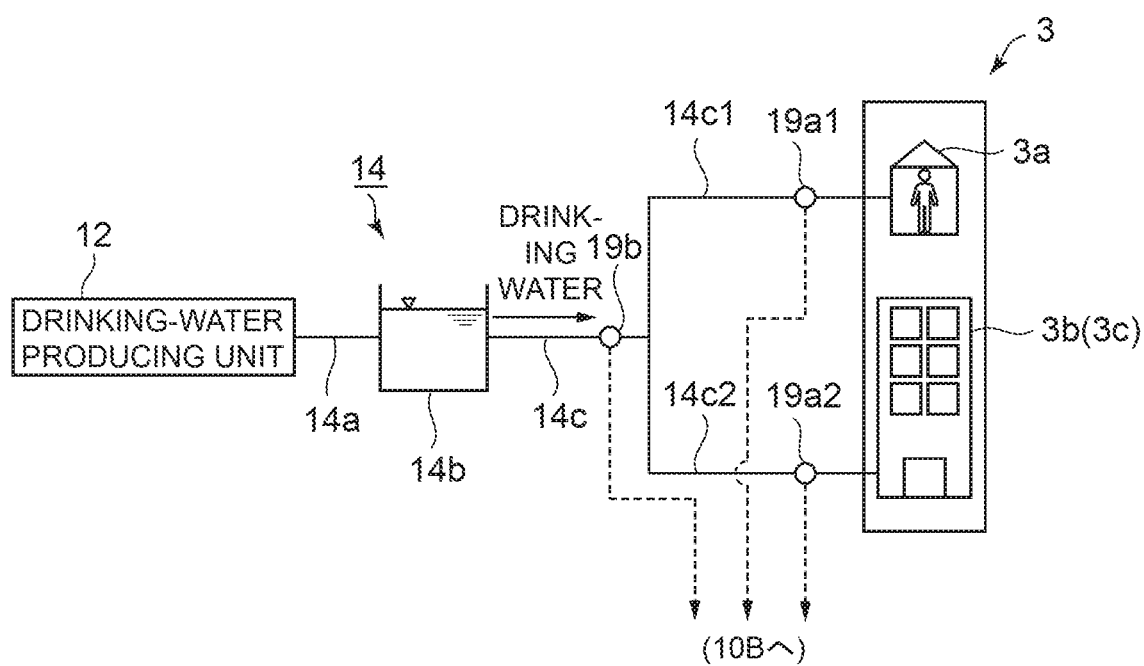
FIG. 8 is a partial schematic diagram of a circulating-water utilization system for describing a drinking-water amount measuring unit and a drinking-water quality measuring unit according to the present embodiment.

As illustrated in FIG. 8, the drinking-water amount measuring unit 19a comprises a plurality of flow meters 19a1, 19a2 disposed respectively in drinking-water channels 14c1, 14c2, so as to measure an amount of drinking water to be supplied to each of the water consuming members including the residence 3a, the tenant shop 3b, and the office 3c. Further, the drinking-water-quality measuring unit 19b comprises a water-quality sensor 19b disposed in the drinking-water channel 14c before branch at an immediately downstream position of the reservoir tank 14b, so that drinking water quality can be collectively measured for drinking water to be supplied to each of the water consuming members. A drinking-water-quality index measured by the water-quality sensor 19b is not limited, but may include a drinking-water-quality index determined in a ministerial order on a standard of water quality (Ordinance of the Ministry of Health, Labour and Welfare No. 101 of May 30, 2005) or other drinking-water-quality indexes. Further, the drinking-water-quality measuring unit 19b may comprise a portable water-quality test kit, a microfluidic device, or the like, instead of the above fixed water-quality sensor. Still further, the drinking water-quality measuring unit 19b may be configured to measure a water-quality index successively or periodically.

Figure 6:
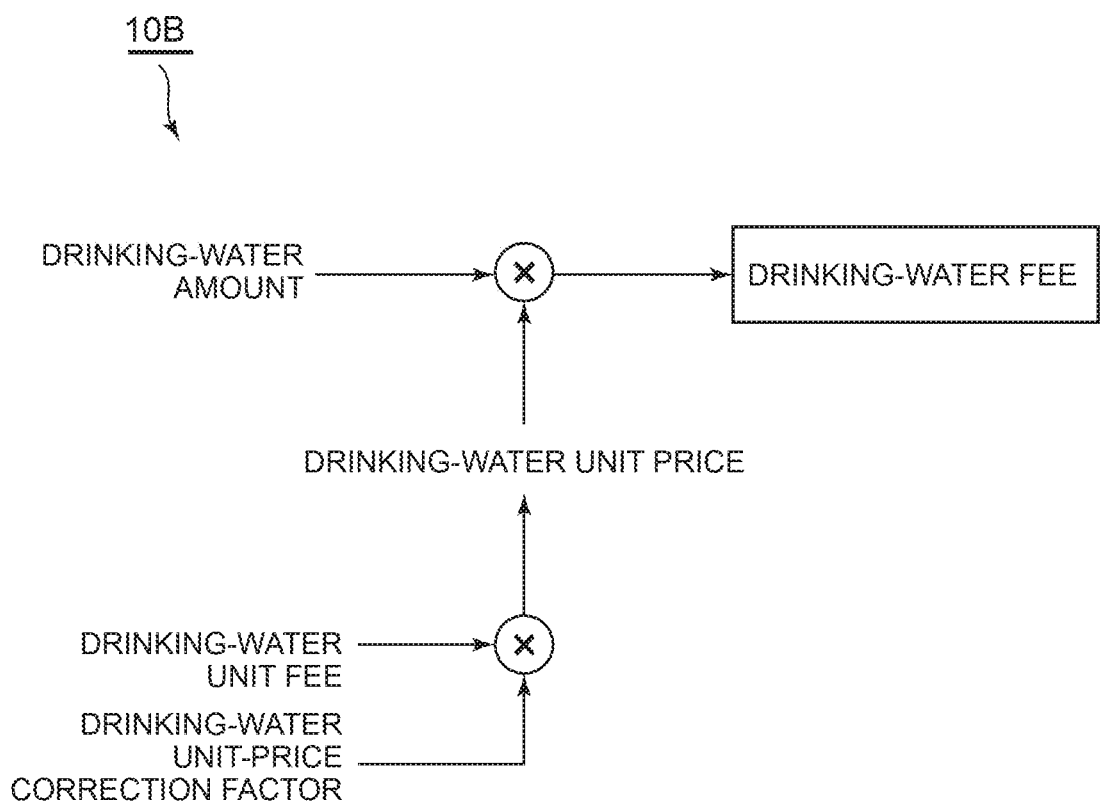
FIG. 6 is a diagram showing a calculation logic of a drinking-water fee for a drinking-water fee calculating part.

FIG. 6 is a diagram showing a calculation logic of a drinking-water fee for a drinking-water fee calculating part. As shown in FIG. 6, the drinking-water fee calculating part 10B calculates a drinking-water fee by multiplying an amount of drinking water to be supplied to each of the water consuming members measured by the drinking-water amount measuring unit 19a by a drinking-water unit price. A drinking-water unit price is calculated by multiplying a drinking-water unit fee by a drinking-water unit-price correction factor set on the basis of a water-quality index related to drinking-water quality measured by the drinking-water-quality measuring unit 19b.

Figure 7:
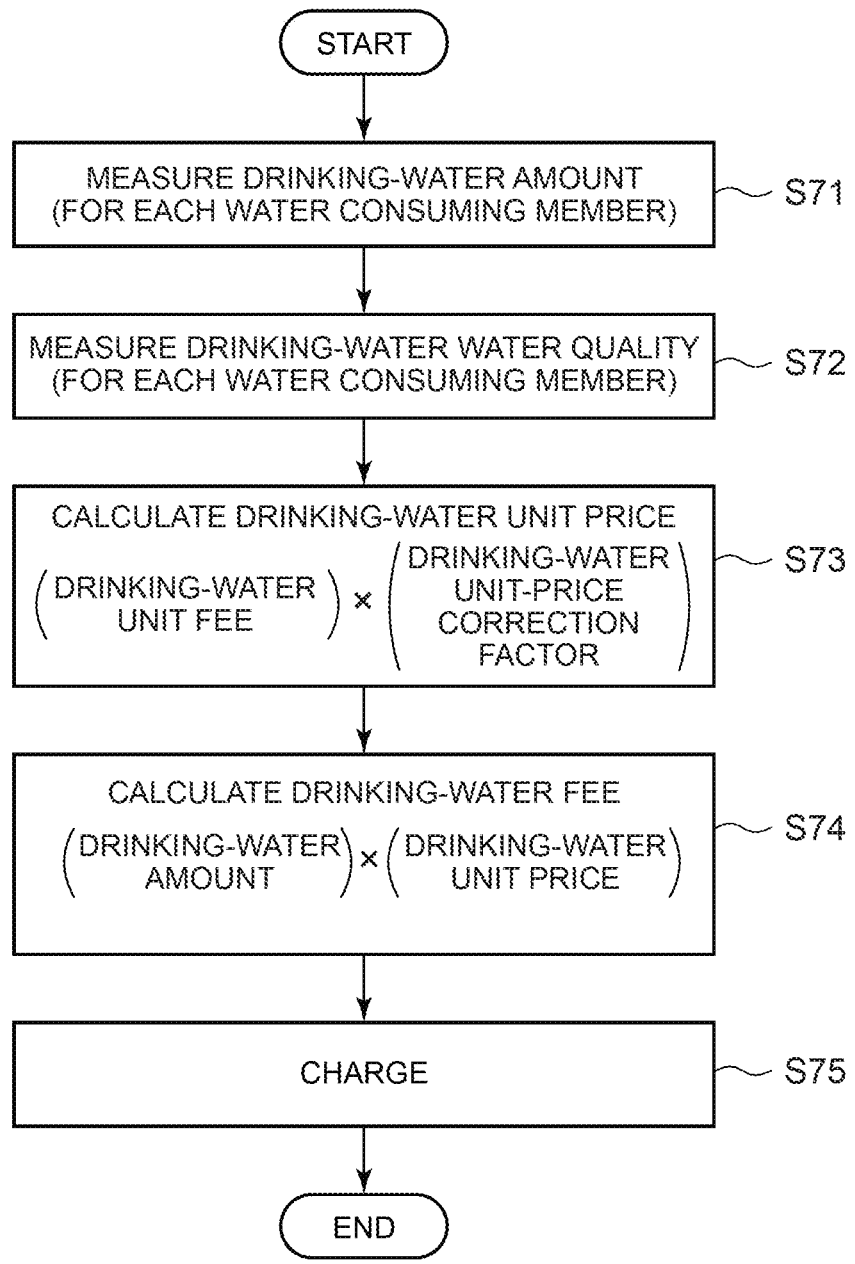
FIG. 7 is a diagram showing a calculation flow of a drinking-water fee of a charging device.

FIG. 7 is a diagram showing a calculation flow of a drinking-water fee of a charging device. As shown in FIG. 7, the above described drinking-water amount measuring unit 19a measures an amount of drinking water to be supplied to each of the water consuming members (S71). Next, the above described drinking-water-quality measuring unit 19b measures a water-quality index related to water quality of drinking water supplied to the water consuming members (S72). The order of steps S71 and S72 may be reversed, or the steps may be performed simultaneously. In step S73, a drinking-water unit price is calculated.

A drinking-water unit price is calculated by multiplying a drinking-water unit fee by a drinking-water unit-price correction factor. A drinking-water unit fee is set for each circulating-water utilization system, each business category, each contract scale, or the like, as a flat fee, for instance. A drinking-water unit-price correction factor is a correction factor set in accordance with drinking-water quality of drinking water to be supplied, and set higher with an increase in the quality of drinking water.

For instance, a user may smell chlorine from drinking water with a higher concentration of remaining chlorine or nitrogen trichloride. Thus, the lower the concentration of these substances is, the higher the drinking-water unit-price correction factor is set. Further, the lower the threshold odor number (TON) is, the higher the drinking-water unit-price correction factor is set. TON is an index of a strength of odor. Further, a user may smell moldy from drinking water with a higher concentration of 2-Methylisoborneol or geosmin. Thus, the lower the concentration of these substances is, the higher the drinking-water unit-price correction factor is set. Further, drinking water with a higher concentration of organic substances (TOC) tastes unpleasant. Thus, the lower the concentration of the organic substances is, the higher the drinking-water unit price correction factor is set. Further, drinking water with a higher color intensity or turbidity looks unpleasant. Thus, the lower the color intensity or the turbidity is, the higher the drinking-water unit-price correction factor is set.

Referring again to the flowchart of FIG. 7, a drinking-water unit price is calculated in step S73, and then a drinking-water amount is multiplied by the calculated drinking-water unit price to obtain a drinking-water fee (S74). Then, finally, the calculated drinking-water fee is charged on each of the water consuming members (S75).

According to the embodiment, it is possible to calculate a drinking-water fee of drinking water to be supplied to each of the water consuming members on the basis of not only an amount of drinking water to be supplied but also a drinking-water quality of the drinking water.

It should be noted that raw water of drinking water in the circulating-water utilization system 1 is not limited to tap water, and may be well water, river water, or desalinated sea water, for instance.

Further, a drinking-water unit fee may be set in accordance with the water quality of raw water of drinking water. In this way, if water with a low quality such as river water and well water or tap water in a specific area is taken in as raw water of drinking water, it is possible to set a drinking-water unit fee corresponding to a load of the drinking-water producing unit 12.

Figure 9:
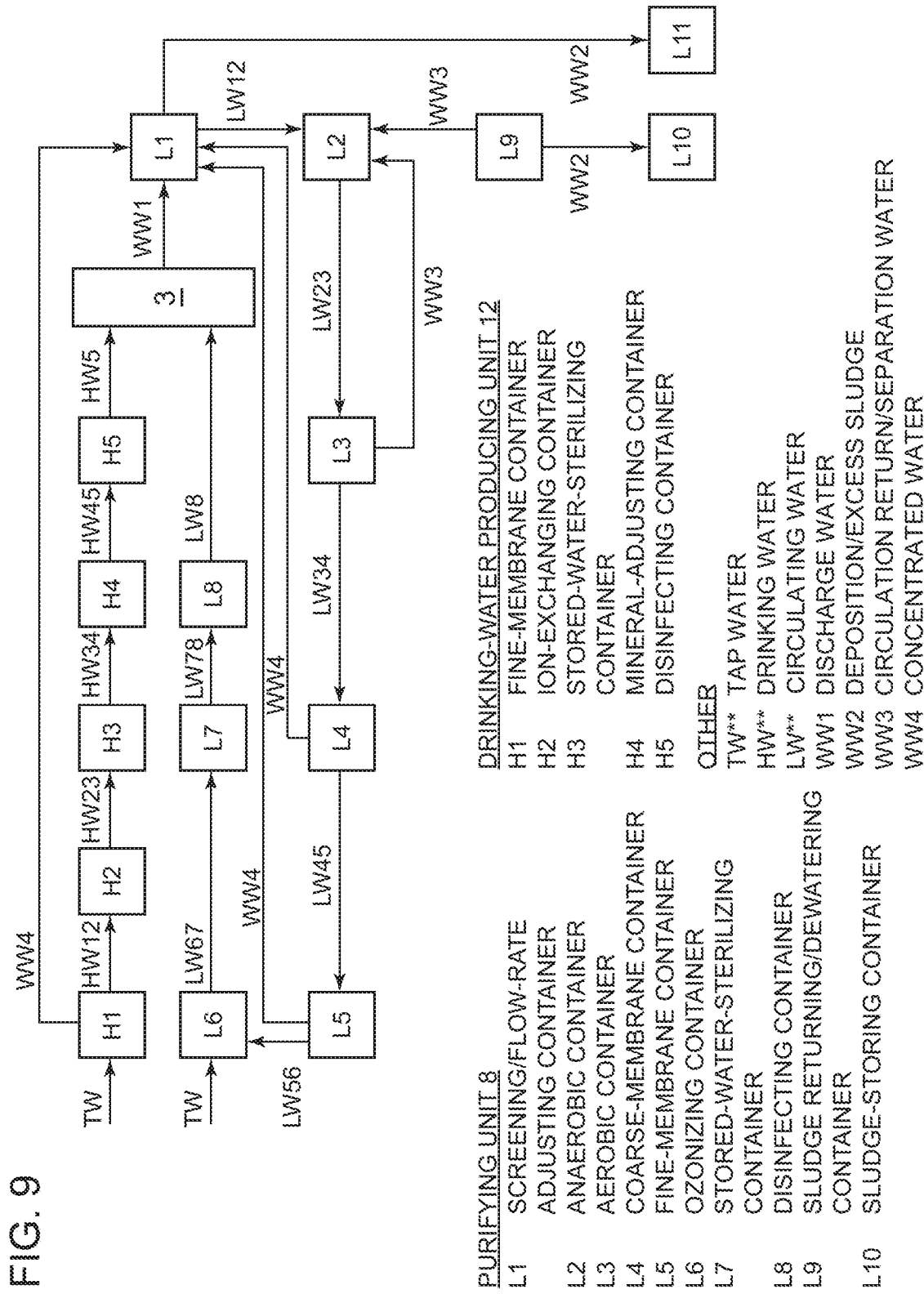
FIG. 9 is a schematic diagram corresponding to the circulating-water utilization system depicted in FIG. 1, showing an example of a layout of treatment vessels of a purifying unit and of a drinking-water producing unit in particular.

FIG. 9 is a schematic diagram corresponding to the circulating-water utilization system depicted in FIG. 1, showing an example of a layout of treatment vessels of a purifying unit and a drinking-water producing unit in particular. In an embodiment illustrated in FIG. 9, the purifying unit 8 comprises a screening/flow-rate-adjusting container L1, an anaerobic container L2, an aerobic container L3, a coarse-membrane container L4, a fine-membrane container L5, an ozonizing container L6, a stored-water-sterilizing container L7, and a disinfecting container L8, connected in series in this order.

The screening/flow-rate-adjusting container L1 is a treatment vessel that removes residue or oil from wastewater, and equipped with an oil trap, a screening device, or the like. The anaerobic container L2 and the aerobic container L3 are treatment vessels for removing organic substances from wastewater by performing an anaerobic treatment and an aerobic treatment. Various known processes may be employed for the treatments, including the A2O activated sludge process, the batch activated sludge process, the contact oxidation process, and the oxidation ditch process, for instance. The coarse-membrane container L4 is a treatment vessel for separating sludge from wastewater. Various devices and processes may be employed, including a settling tank, a MF membrane, a UF membrane, and centrifugal separation, for instance. The fine-membrane container L5 is a treatment vessel for improving the water quality of circulating water to the level of clean water. Various devices and processes may be employed, including a reverse osmosis membrane, activated charcoal, a sand filter, an ozone generator, an ion exchanger, and a mineral adding device, for instance. The ozonizing container L6 is a treatment vessel for ozonizing purified circulating water. The stored-water-sterilizing container L7 is a treatment vessel for storing purified circulating water temporarily while sterilizing the circulating water with UV or the like. The disinfecting container L8 is a treatment vessel for disinfecting purified circulating water with UV, chlorine, ozone, or the like.

A sludge-returning/sludge-dewatering container L9 is a treatment vessel for dewatering and drying sludge. Sludge-storing containers L10, L11 are treatment vessels for storing waste produced during sewage treatment. The waste includes, for instance, sludge cake and residue. Excess sludge such as sludge cake stored in the sludge-storing containers L10, 11 are carried out of the system by, for instance, being collected by a fertilizer maker.

Further, in an embodiment illustrated in FIG. 9, the drinking-water producing unit 12 comprises a fine-membrane container H1, an ion-exchanging container H2, a stored-water-sterilizing container H3, a mineral-adjusting container H4, and a disinfecting container H5, connected in series in this order. The fine-membrane container H1, the ion-exchanging container H2, the stored-water-sterilizing container H3, the mineral-adjusting container H4, and the disinfecting container H5 are treatment vessels for further purifying tap water to improve its quality as high as that of mineral waters sold in market.

The fine-membrane container H1 includes various devices and processes such as a reverse osmosis membrane, activated charcoal, and a sand filter, for instance. The ion-exchanging container H2 includes an ion-exchanging device, for instance. The stored-water-sterilizing container H3 is a treatment vessel for storing purified tap water temporarily while sterilizing the purified tap water with UV or the like. The mineral-adjusting container L4 includes a mineral-adding device, for instance. The disinfecting container H5 is a treatment vessel for disinfecting purified tap water with UV, chlorine, ozone, or the like.

It should be noted that the above described layouts and configurations of the treatment vessels of the purifying unit 8 and the drinking-water producing unit 12 are merely examples, and various modifications may be implemented in accordance with a water quality of wastewater to be discharged or a target purification standard. Further, the reference sign TW in the drawing represents a flow of tap water supplied from a public water works system. Tap water TW may be supplied not only to the drinking-water producing unit 12 as described above, but also to the circulation channel 2 as makeup water if needed. In this case, tap water TW may be supplied at a downstream side of the fine-membrane container L5, where purification of wastewater is nearly completed. Further, the reference sign WW4 in the drawing represents a returning line for feeding concentrated water to the screening/flow-rate-adjusting container L1.

As described above, in the novel circulating-water utilization system 1 being developed by the present applicant, the purifying unit 8 for purifying waste water and the drinking-water producing unit 12 for purifying tap water both comprise container-type treatment vessels which include containers each of which houses a treatment device that performs a treatment step, which is one of three or more treatment steps into which a series of purifying steps is divided. A container-type treatment vessel that performs the first treatment step, a container-type treatment vessel that performs the second treatment step, and a container type treatment vessel that performs the third treatment step are carried into a site, and connected in series via connection piping, and thereby the purifying unit 8 is constructed. Such a container-type treatment vessel can be loaded onto a truck to be transported as it is, and thus has a high transportability. Further, such a container-type treatment vessel is housed in a container housing removably, and thus can be installed and removed as desired.

With regard to processing capacity, the above container-type treatment vessels are each supposed to be capable of processing wastewater from approximately 1,000 persons. Thus, to introduce the present circulating-water utilization system to an area or a complex inhabited by as many as 10,000 persons, for instance, a plurality of (e.g. ten) treatment vessels that performs the same treatment process is required. With a plurality of treatment vessels that performs the same treatment process provided as described above, it is possible to reduce processing capacity per treatment vessel. Thus, it is possible to flexibly address population variation in a target area or seasonal variation of water demand. Further, a substitute treatment vessel can be prepared readily, and maintainability is improved.

Figure 10:
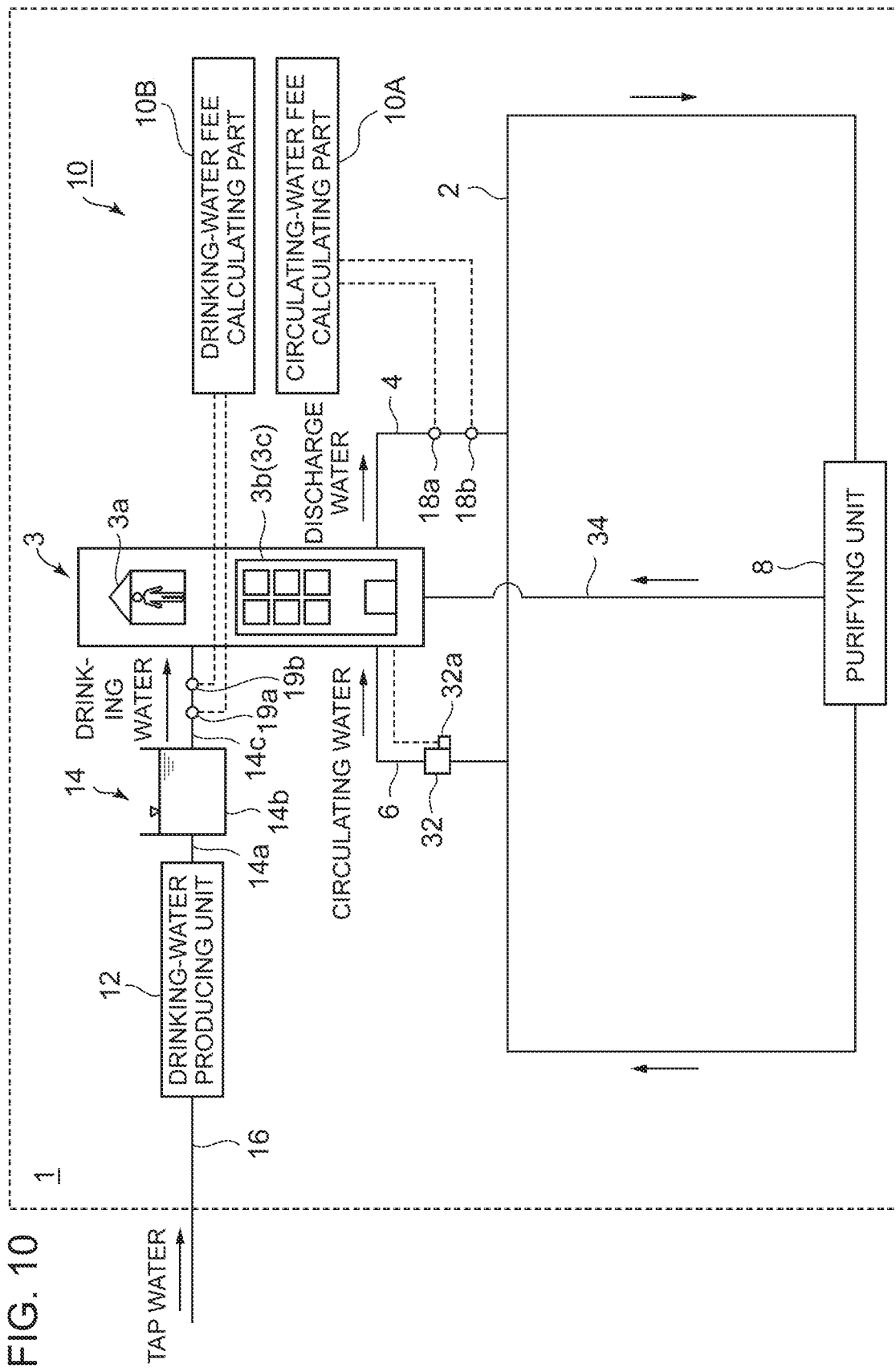
FIG. 10 is an overall schematic diagram of a circulating-water utilization system according to at least one embodiment of the present invention.

FIG. 10 is an overall schematic diagram of a circulating-water utilization system according to at least one embodiment of the present invention.

In some embodiments, as depicted in FIG. 10, the circulating-water utilization system 1 further includes a circulating-water monitoring unit 32 which monitors the water quality of daily life water flowing through the supply channel 6, and a notifying unit 32*a* which notifies the water consumer 3 of a monitoring result obtained by the circulating-water monitoring unit 32.

For an example, the circulating-water monitoring unit 32 may comprise a an automatic water-quality monitoring device which automatically measures color intensity, turbidity, remaining chlorine, pH, conductivity, temperature, or the like of tap water, for example at a predetermined interval of time. Further, the tap-water-quality monitoring unit 28 may comprise a portable water-quality test kit, a microfluidic device, or the like, instead of a fixed water-quality monitoring device.

The notifying unit 32*a* may transmit data related to a measurement result measured by the automatic water-quality monitoring device to display the data on a monitor or the like disposed near a water consuming member.

According to this embodiment, the water consumer is notified of a water quality of supplied daily life water, and thereby it is possible to enhance trust from the water consumer 3 on the purifying unit 8 of the circulating-water utilization system 1.

Figure 11:
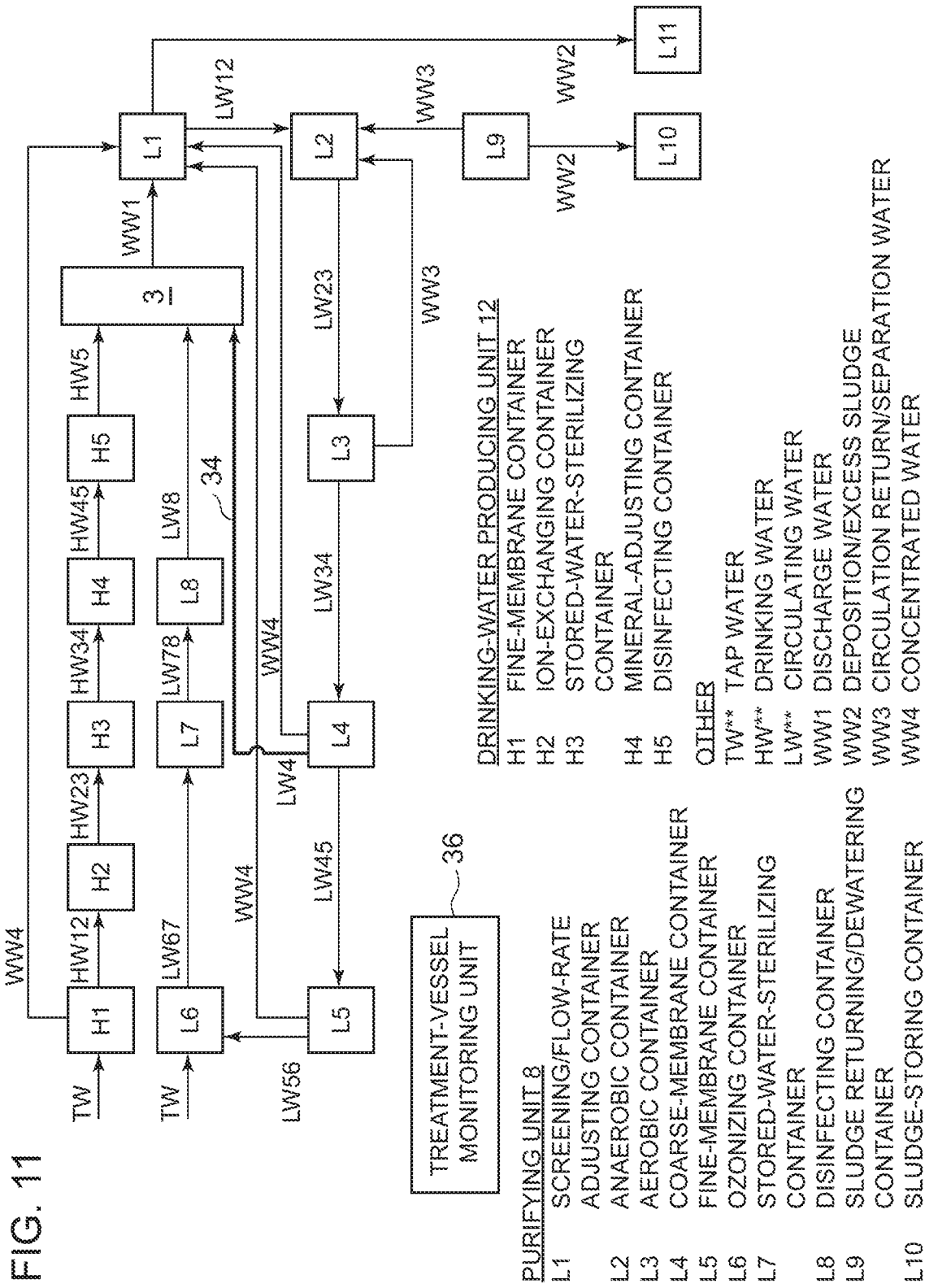
FIG. 11 is a schematic diagram corresponding to the circulating-water utilization system depicted in FIG. 10, showing an example of a layout of treatment vessels of a purifying unit and of a drinking-water producing unit in particular.

FIG. 11 is a schematic diagram corresponding to the recirculating-water utilization system depicted in FIG. 10, showing an example of a layout of treatment vessels of a purifying unit and a drinking-water producing unit in particular.

In some embodiments, as depicted in FIG. 11, two of the treatment vessels L1 to L8 constituting the purifying unit 8 are a sludge-separating treatment vessel with a fine filtering membrane for filtering sludge contained in wastewater, and an advanced treatment vessel for filtering wastewater which performs the next treatment step of the one performed by the sludge-separating treatment vessel. Further, the circulating-water utilization system 1 further comprises a gray-water supply channel 34 which supplies processed water discharged from the sludge-separating treatment vessel to the water consumer 3 as gray water.

The sludge-separating treatment vessel with a fine filtering membrane for filtering sludge contained in wastewater corresponds to a coarse-membrane container L4 among a plurality of treatment vessels consisting the above described purifying unit 8. Further, the advanced treatment vessel for filtering wastewater corresponds to a fine-membrane container L5 among a plurality of treatment vessels consisting the above described purifying unit 8.

If the water consumer 3 is an office building composed of a plurality of the offices 3*c*, for instance, a larger proportion of daily life water supplied to the water consumer 3 may be used in a way that does not involve contact with human skin, such as flushing toilets. Thus, according to this embodiment, circulating water purified by the sludge-separating treatment vessel to such a level that the circulating water can be utilized as flushing water is supplied to the water consumer 3 as gray water, and thereby it is possible to reduce energy cost of subsequent purifying steps.

In some embodiments, as depicted in FIG. 11, the circulating-water utilization system 1 further comprises a treatment-vessel monitoring unit 36 that remotely monitors an operational ratio of treatment vessels constituting the purifying unit 8 and the drinking-water producing unit 12.

Each of the treatment vessels constituting the purifying unit 8 and the drinking-water producing unit 12 is provided with an operational-ratio sensor for detecting an operational ratio of the treatment vessel. Further, information related to the operational ratios of the respective treatment vessels detected by the operational-ratio sensors is transmitted to the treatment-vessel monitoring unit 36 disposed at a distance from the purifying unit 8 via wire or wirelessly. The transmitted information data related to the operational ratios of the respective treatment vessels is displayed on a display unit of the treatment-vessel monitoring unit 36. An operator who manages the present circulating-water utilization system 1 monitors the operational ratios of the respective treatment vessels displayed by the treatment-vessel monitoring unit 36.

According to this embodiment, the operational ratios of the treatment vessels constituting the purifying unit 8 and the drinking-water producing unit 12 are monitored remotely, which makes it possible to determine addition and removal of treatment vessels quickly and readily.

Further, in the above embodiment, each of the treatment vessels constituting the purifying unit 8 and the drinking-water producing unit 12 may be provided with an abnormality sensor for detecting abnormality of the treatment vessel. If the abnormality detection sensor detects abnormality of the treatment vessel, the abnormality information may be transmitted to the treatment-vessel monitoring unit 36 via wire or wirelessly.

According to this embodiment, abnormality of the treatment vessels constituting the purifying unit 8 and the drinking-water producing unit 12 is monitored remotely, which makes it possible to perform maintenance on the treatment vessels quickly.

Figure 12:
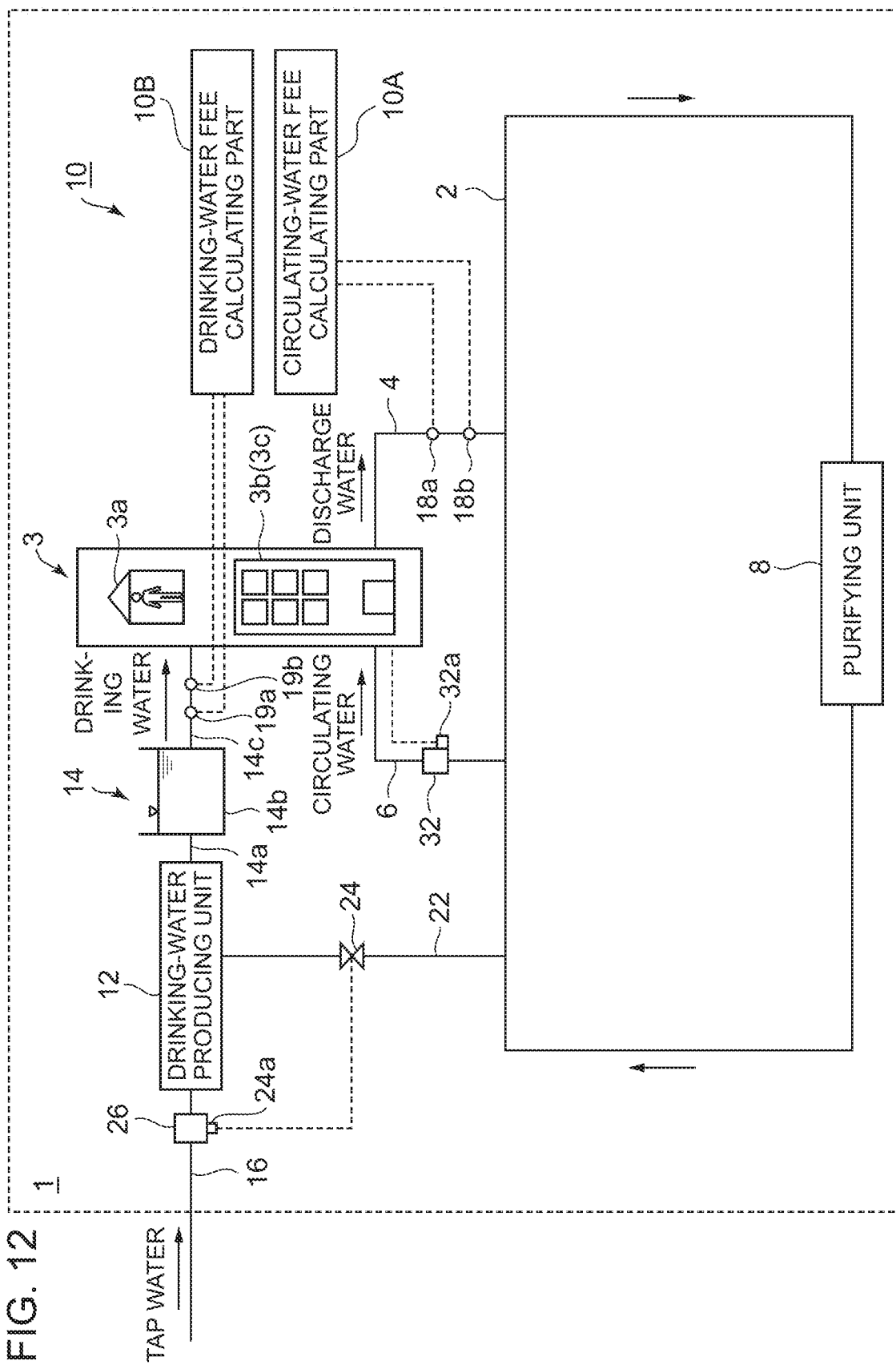
FIG. 12 is an overall schematic diagram of a circulating-water utilization system according to at least one embodiment of the present invention.
Figure 13:
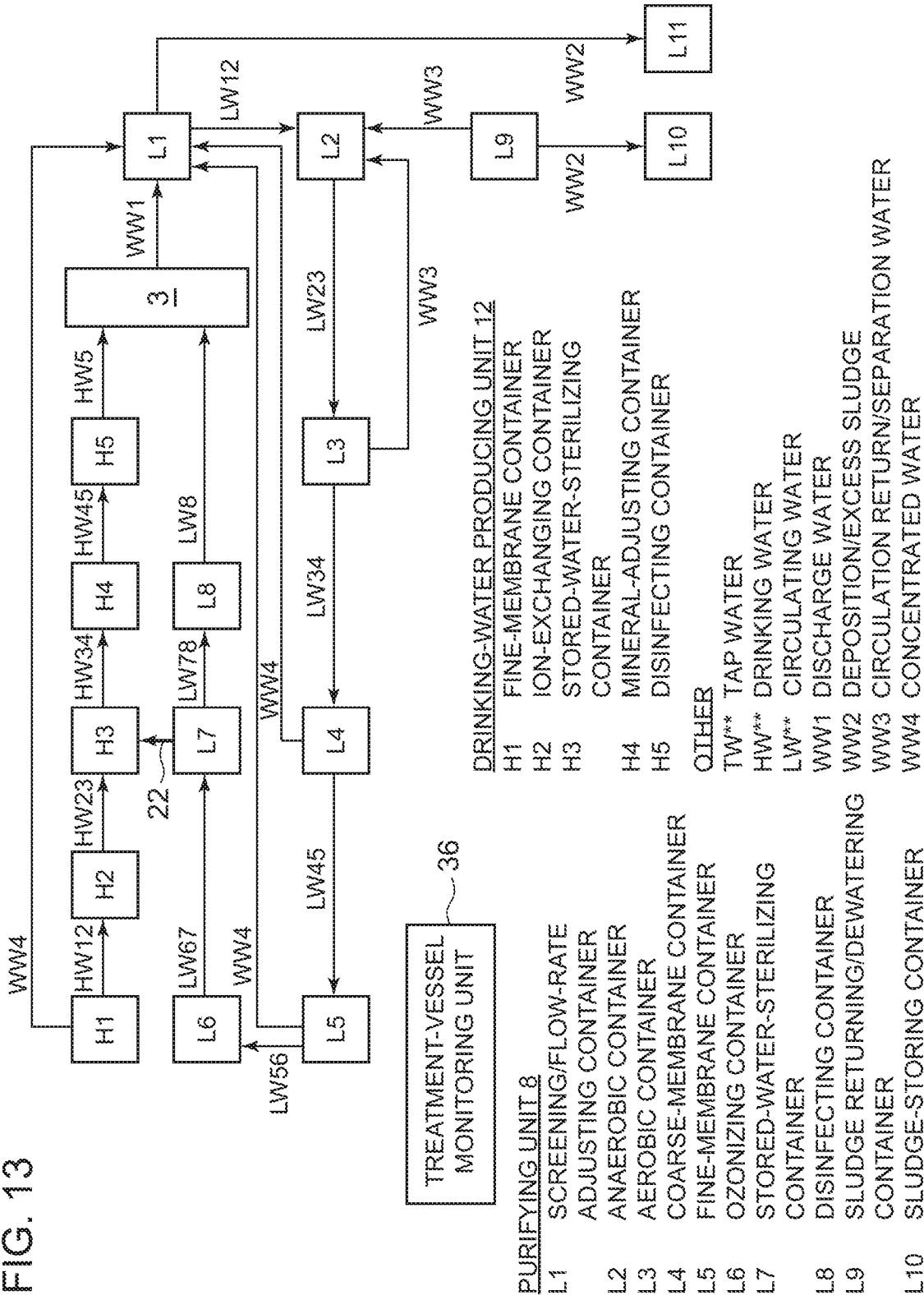
FIG. 13 is a schematic diagram corresponding to the circulating-water utilization system depicted in FIG. 12, showing an example of a layout of treatment vessels of a purifying unit and of a drinking-water producing unit in particular.

FIG. 12 is an overall schematic diagram of a circulating-water utilization system according to at least one embodiment of the present invention. FIG. 13 is a schematic diagram corresponding to the recirculating-water utilization system depicted in FIG. 12, showing an example of a layout of treatment vessels of a purifying unit and a drinking-water producing unit in particular.

In some embodiments, as depicted in FIGS. 12 and 13, the circulating-water utilization system 1 further comprises a purified-water supply channel 22 connecting the circulation channel 2 and the drinking-water producing unit 12 and being provided for supplying circulating water purified by the purifying unit 8 to the drinking-water producing unit 12, and a gate valve 24 which opens and closes the purified-water supply channel 22. The gate valve 24 is normally closed and circulating water is not supplied to the drinking-water producing unit 12, but opens if supply of tap water from a waterworks system is stopped, for instance, so as to supply circulating water to the drinking-water producing unit 12 via the purified-water supply channel 22.

In some embodiments, as depicted in FIG. 12, the circulating-water utilization system 1 further comprises a water-outage detection unit 26 capable of detecting outage of water in a waterworks system, and a gate-valve control unit 24a configured to control switching of the gate valve 24, and is configured such that the gate-valve control unit 24a opens the gate valve 24 if the water-outage detection unit 26 detects outage in a waterworks system. Outage may be detected by utilizing outage information issued by a waterworks bureau or the like.

According to this embodiment, if the water-outage detection unit 26 detects outage of a waterworks system, the gate-valve control unit 24a opens the gate valve 24, and purified circulating water is supplied to the drinking-water producing unit 12 through the purified-water supply channel 22. Thus, even in the event of water outage of a waterworks system, water can be supplied continuously to the drinking-water producing unit 12.

Figure 14:
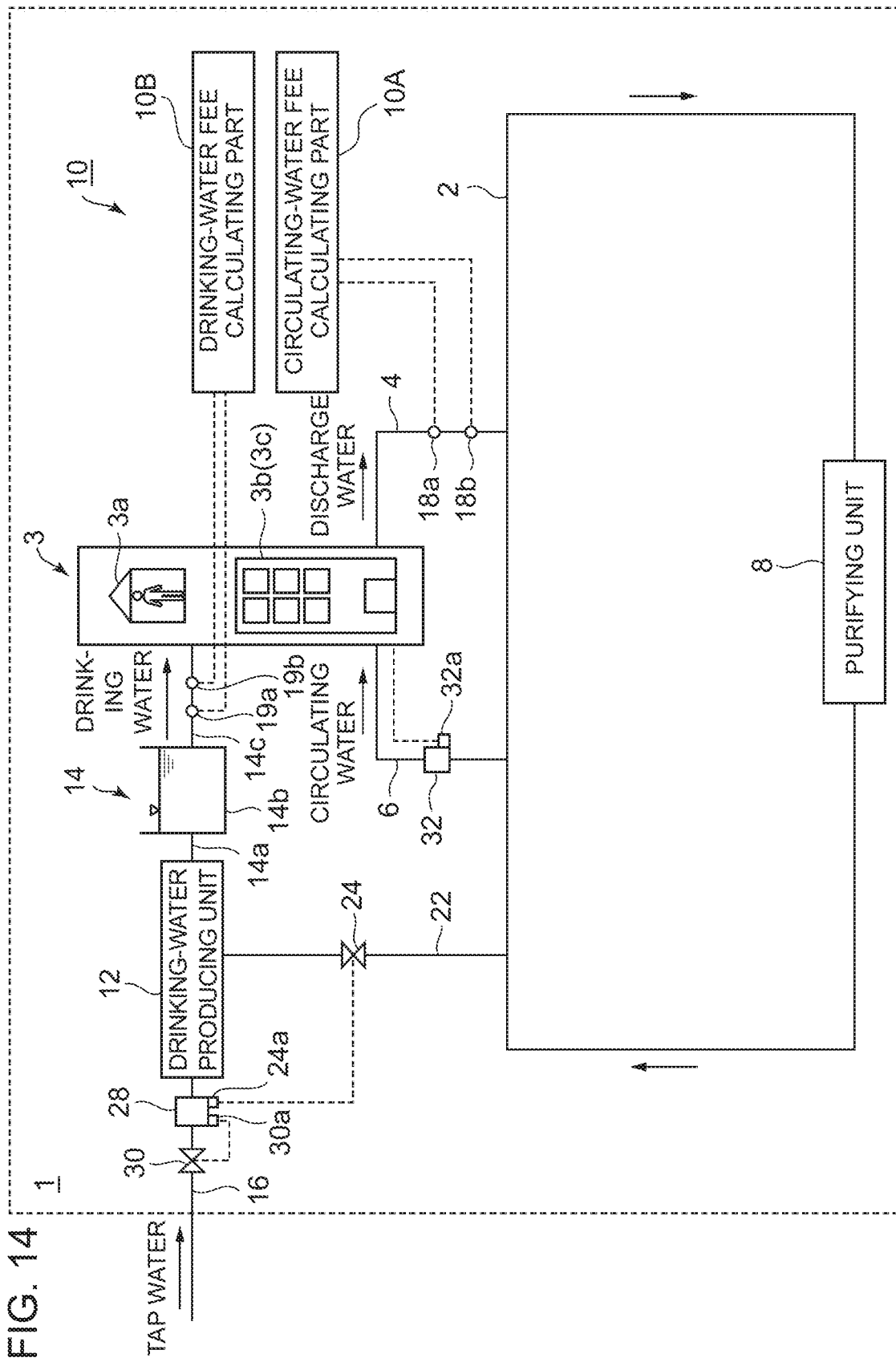
FIG. 14 is an overall schematic diagram of a circulating-water utilization system according to at least one embodiment of the present invention.

FIG. 14 is an overall schematic diagram of a circulating-water utilization system according to at least one embodiment of the present invention.

In some embodiments, as depicted in FIG. 14, the circulating-water utilization system 1 further comprises a tap-water monitoring unit 28 which monitors water quality of tap water, a tap-water shutoff valve 30 capable of shutting off intake of tap water, the gate-valve control unit 24a which controls switching of the gate valve 24, and a tap-water shutoff valve control unit 30a which controls operation of the tap-water shutoff valve 30. If the tap-water monitoring unit 28 detects deterioration of water quality of tap water to below a predetermined water level, the gate-valve control unit 24a opens the gate valve 24, which is normally closed. Further, the tap-water shutoff valve control unit 30a operates the tap-water shutoff valve 30, which is normally open, to shut off intake of tap water.

For an example, the tap-water monitoring unit 28 may comprise a an automatic water-quality monitoring device which automatically measures color intensity, turbidity, remaining chlorine, pH, conductivity, temperature, or the like of tap water, for example at a predetermined interval of time, similarly to the circulating-water monitoring unit 32. Further, the tap-water-quality monitoring unit 28 may comprise a portable water-quality test kit, a microfluidic device, or the like, instead of a fixed water-quality monitoring device.

According to this embodiment, if the tap-water monitoring unit 28 detects deterioration of water quality of tap water to below a predetermined water quality level, the tap-water shutoff valve control unit 30a operates the tap-water shutoff valve 30 to shutoff intake of tap water, and the gate-valve control unit 24a opens the gate valve 24 to supply purified circulating water to the drinking-water producing unit 12 through the purified-water supply channel 22. Thus, even in the event of deterioration of water quality of tap water, water can be supplied continuously to the drinking-water producing unit 12.

Figure 15:
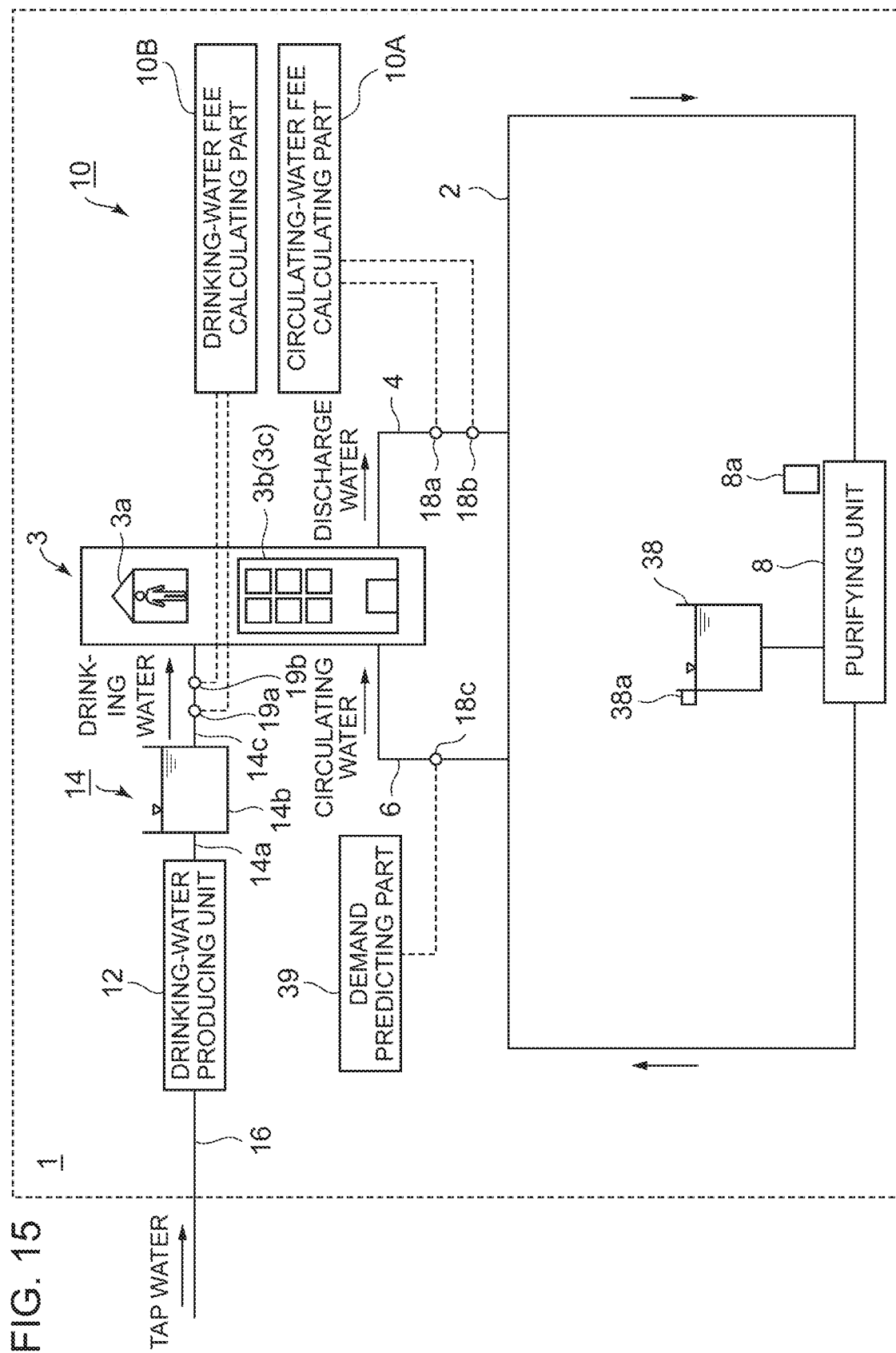
FIG. 15 is an overall schematic diagram of a circulating-water utilization system according to at least one embodiment of the present invention.
Figure 16:
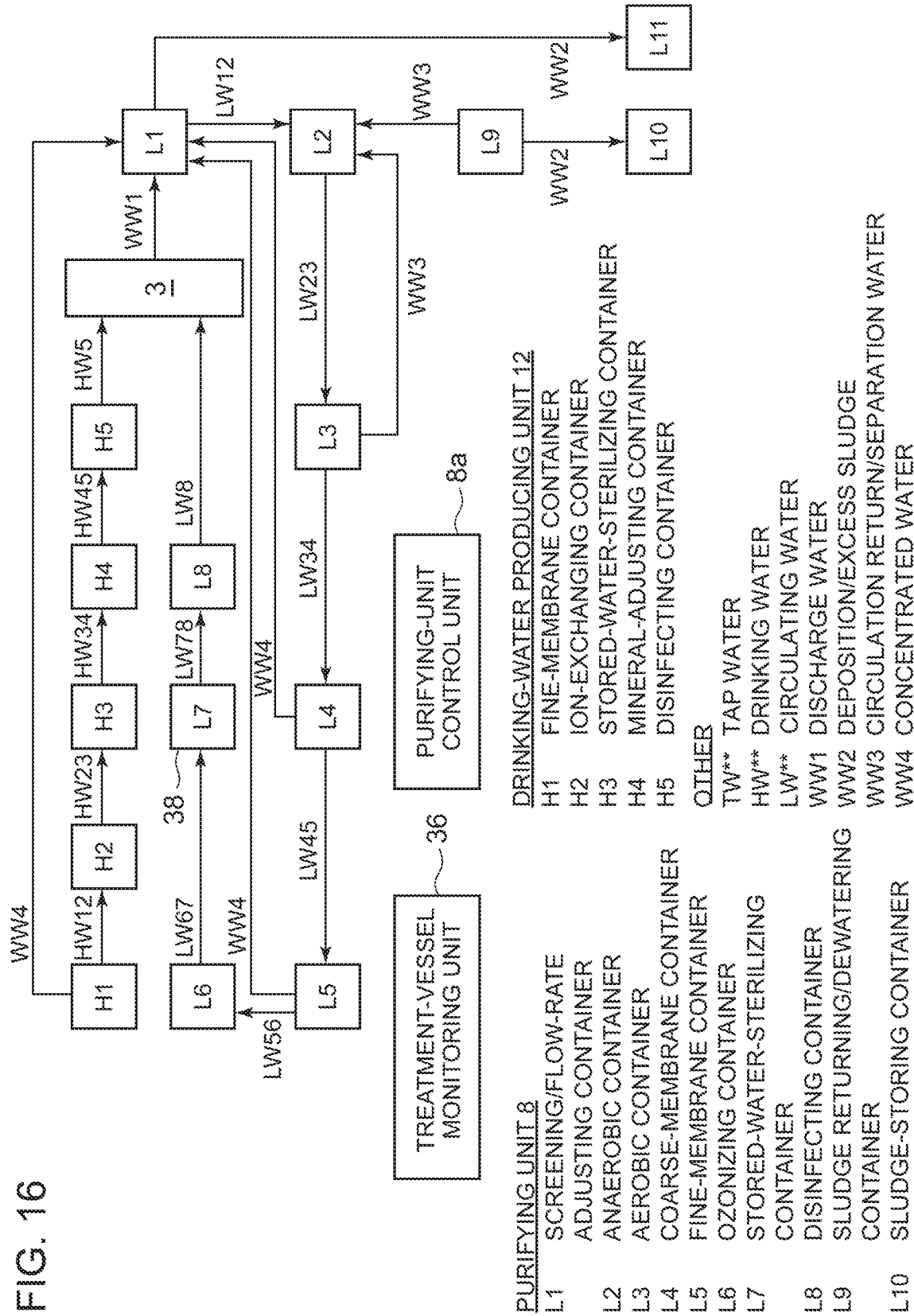
FIG. 16 is a schematic diagram corresponding to the circulating-water utilization system depicted in FIG. 15, showing an example of a layout of treatment vessels of a purifying unit and of a drinking-water producing unit in particular.

FIG. 15 is an overall schematic diagram of a circulating-water utilization system according to at least one embodiment of the present invention. FIG. 16 is a schematic diagram corresponding to the recirculating-water system depicted in FIG. 15, showing an example of a layout of treatment vessels of a purifying unit and a drinking-water producing unit.

In some embodiments, as depicted in FIG. 15, the circulating-water utilization system 1 further comprises a circulating-water storage tank 38 which stores circulating water purified by the purifying unit 8, a storage-amount measuring unit 38a which measures a storage amount of circulating water stored in the circulating-water storage tank 38, and a purifying-unit control unit 8a which controls operation of the purifying unit 8.

The circulating-water storage tank 38 may be provided separately from the purifying unit 8, or the above described stored-water-sterilizing container L7 may be the circulating-water storage tank 38, as depicted in FIG. 16. The storage-amount measuring unit 38a may be, for an example, a water gauge which measures a water level of the circulating-water storage tank 38. The purifying-unit control unit 8a is configured to control operation of the entire purifying unit 8 by controlling pumps and valves, for instance, to control supply of circulating water to be fed to the purifying unit 8 and to control operation of devices of various treatment vessels constituting the purifying unit 8.

According to this embodiment, purification cost can be reduced by, for instance, operating the purifying unit 8 in preference during hours when electric fee is less expensive, such as night time. Further, if a storage amount of the circulating-water storage tank 38 measured by the storage-amount measuring unit 38a is below a predetermined storage amount, the purifying unit 8 may operate regardless of time, and thereby it is possible to avoid shortage of daily life water to be supplied to the water consumer 3.

In some embodiments, as depicted in FIG. 15, the circulating-water utilization system 1 comprises a daily-life-water amount measuring unit 18c which measures an amount of daily life water to be supplied to the water consumer 3 from the supply channel 6, and a demand predicting part 39 which predicts demand for an amount of daily life water.

The demand predicting part 39 is configured as a microcomputer including a central processing unit (CPU), a random access memory (RAM), a read only memory (ROM), and an I/O interface. The daily-life-water amount measuring unit 18c comprises, for instance, a flow meter 18c. Further, the demand predicting part 39 is configured to store measured amounts of daily life water obtained by the daily-life-water amount measuring unit 18c hourly, and to predict water future water demand for daily life water on the basis of past daily-life-water amounts stored therein.

Water demand may be predicted by using an amount of daily life water amount supplied on the same month, date, day of week, time slot, or the like in the past as a predicted value of water demand. Further, the predicted water demand may be corrected on the basis of ambient information such as temperature and humidity.

According to this embodiment, it is possible to drive the purifying unit 8 in accordance with a prediction result of water demand when needed, and thereby it is possible to operate the purifying unit 8 efficiently.

The embodiments of the present invention have been described above. However, the present invention is not limited thereto. For instance, various modifications may be applied as long as they do not depart from the object of the present invention.

INDUSTRIAL APPLICABILITY

At least one embodiment of the present invention can be suitably applied to a circulating-water utilization system to be constructed in a specific area separately from a public waterworks system.

DESCRIPTION OF REFERENCE NUMERALS

1 Circulating-water utilization system
2 Circulation channel
3 Water consumer
3*a* Residence
3*b* Tenant shop
3*c* Office
4 Discharge channel
6 Supply channel
8 Purifying unit
8*a* Purifying-unit control unit
10 Charging unit (charging device)
10A Circulating-water fee calculating part
10B Drinking-water fee calculating part
12 Drinking-water producing unit
14 Drinking-water supply unit
14*a* Drinking-water feeding channel
14*b* Reservoir tank, drinking-water tank
14*c* Drinking-water channel
16 Tap-water introducing channel
18*a* Wastewater amount measuring unit (flow meter)
18*b* Water-quality measuring unit (water-quality sensor)
18*c* Daily-life-water amount measuring unit (flow meter)
19*a* Drinking-water amount measuring unit (flow meter)
19*b* Drinking water-quality measuring unit (water-quality sensor)
22 Purified-water supply channel
24 Gate valve
24*a* Gate-valve control unit
26 Water-outage detection unit
28 Tap-water monitoring unit
30 Tap-water shutoff valve
30*a* Tap-water shutoff valve control unit
32 Circulating-water monitoring unit
32*a* Notifying unit
34 Gray-water supply channel
36 Treatment-vessel monitoring unit
38 Circulating-water storage tank
38*a* Storage-amount measuring unit
39 Demand predicting part

The invention claimed is:

1. A charging device of a circulating-water utilization system which comprises: a circulation channel through which circulating water flows;

a discharge channel through which wastewater discharged from a water consumer is discharged to the circulation channel, the water consumer being composed of a plurality of water consuming members including at least one of a residence, a tenant shop, or an office which uses the circulating water flowing through the circulation channel;

a purifying unit comprising at least one of treatment vessels configured to purify the circulating water containing the wastewater flowing through the circulation channel;

a supply channel configured to supply the circulating water purified by the purifying unit to the water consumer; and a charging device configured to calculate a circulating-water fee for each of the water consuming members, the circulating-water fee being a consideration for the circulating-water supplied from the supply channel, wherein the discharge channel includes a plurality of sub-discharged channels through which the wastewater discharged from each of the water consuming members flows, and one main-discharged channel where the plurality of sub-discharged channels merge, the charging device comprising:

a wastewater amount measuring unit comprising at least one of flow meters configured to individually measure an amount of wastewater discharged from each of the water consuming members, the at least one of flow meters being disposed on each of the plurality of sub-discharged channels;

a water-quality measuring unit comprising at least one of water-quality sensors configured to individually measure a water-quality index related to a water quality of the wastewater discharged from each of the water consuming members, the at least one of water-quality sensors being disposed on each of the plurality of sub-discharged channels; and a circulating-water fee calculating part comprising a central processor configured to execute a process of calculating the circulating-water fee of each of the water consuming members on a basis of the amount and the water quality of the wastewater discharged from each of the water consuming members, wherein the circulating-water fee calculating part is configured to calculate the circulating-water fee by multiplying the amount of the wastewater discharged from each of the water consuming members measured by the wastewater amount measuring unit by a wastewater-processing unit price which is set on the basis of the water-quality index related to the water quality of the wastewater discharged from each of the water consuming members measured by the water-quality measuring unit.

2. The charging device of a circulating-water utilization system according to claim 1, wherein the wastewater-processing unit price is set on the basis of a plurality of the water-quality indexes.

3. The charging device of a circulating-water utilization system according to claim 2, wherein the wastewater-processing unit price is set taking account of a weighting factor which is determined in advance for each of the plurality of water-quality indexes.

4. The charging device of a circulating-water utilization system according to claim 3, wherein the wastewater-processing unit price is set in accordance with a water-quality unit-price correction factor which is calculated by multiplying a pollution factor by the weighting factor, the pollution factor being a ratio of an actual measurement of the water quality index to a predetermined standard value.

5. The charging device of a circulating-water utilization system according to claim 1, wherein the circulating-water utilization system further comprises a drinking-water producing unit comprising at least one of treatment vessels configured to produce drinking water for the water consumer by purifying water taken from outside of the system, and
wherein the charging device further comprises:
a drinking-water amount measuring unit comprising at least one of flow meters configured to individually measure an amount of drinking water to be supplied to each of the water consuming members;
a drinking-water-quality measuring unit comprising at least one of water-quality sensors configured to individually measure a drinking-water-quality index related to a drinking-water quality of the drinking water to be supplied to each of the water consuming members; and
a drinking-water fee calculating part comprising a central processor configured to execute a process of calculating a drinking-water fee for each of the water consuming members on the basis of the amount and the drinking-water quality of the drinking water to be supplied to each of the water consuming members.

6. A circulating-water utilization system, comprising:
a circulation channel through which circulating water flows;
a discharge channel through which wastewater discharged from a water consumer is discharged to the circulation channel, the water consumer being composed of a plurality of water consuming members including at least one of a residence, a tenant shop, or an office which uses the circulating water flowing through the circulation channel, the discharge channel including a plurality of sub-discharged channels through which the wastewater discharged from each of the water consuming members flows, and one main-discharged channel where the plurality of sub-discharged channels merge;
a purifying unit comprising at least one of treatment vessels configured to purify the circulating water containing the wastewater flowing through the circulation channel;
a supply channel configured to supply the circulating water purified by the purifying unit to the water consumer; and
a charging device configured to calculate a circulating-water fee for each of the water consuming members,
the charging device comprising:
a wastewater amount measuring unit comprising at least one of flow meters configured to individually measure an amount of wastewater discharged from each of the water consuming members;
a water-quality measuring unit comprising at least one of water-quality sensors configured to individually measure a water-quality index related to a water quality of the wastewater discharged from each of the water consuming members; and
a circulating-water fee calculating part comprising a central processor configured to execute a process of calculating the circulating-water fee of each of the water consuming members on a basis of the amount and the water quality of the wastewater discharged from each of the water consuming members.

* * * * *